(12) United States Patent
Lim et al.

(10) Patent No.: US 11,503,129 B2
(45) Date of Patent: *Nov. 15, 2022

(54) METHOD AND APPARATUS FOR DYNAMICALLY PRESENTING CONTENT USING AN INTERFACE FOR SETTING CONDITIONAL NETWORK DESTINATIONS

(71) Applicant: LIFE IN MOBILE INNOVATIONS, INC., Stamford, CT (US)

(72) Inventors: John W. Lim, Rye Brook, NY (US); John M. Packes, Jr., Norwalk, CT (US)

(73) Assignee: LIFE IN MOBILE INNOVATIONS, INC., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,689

(22) Filed: Aug. 9, 2021

(65) Prior Publication Data

US 2022/0036423 A1 Feb. 3, 2022

Related U.S. Application Data

(63) Continuation of application No. 16/542,655, filed on Aug. 16, 2019, now Pat. No. 11,089,120, which is a
(Continued)

(51) Int. Cl.
| | |
|---|---|
| *H04L 67/52* | (2022.01) |
| *G06F 16/955* | (2019.01) |
| *H04W 4/14* | (2009.01) |
| *H04W 4/021* | (2018.01) |
| *G06Q 30/02* | (2012.01) |

(Continued)

(52) U.S. Cl.
CPC .......... *H04L 67/52* (2022.05); *G06F 16/9554* (2019.01); *G06F 16/9558* (2019.01); *G06Q 30/0207* (2013.01); *G06Q 30/0277* (2013.01); *H04L 51/222* (2022.05); *H04L 61/10* (2013.01); *H04L 67/563* (2022.05); *H04W 4/02* (2013.01); *H04W 4/021* (2013.01); *H04W 4/14* (2013.01); *H04W 12/63* (2021.01)

(58) Field of Classification Search
CPC . H04L 67/18; G06F 16/9558; G06F 16/9554; G06Q 30/0207; G06Q 30/0277
USPC ....................................................... 235/375
See application file for complete search history.

(56) References Cited

U.S. PATENT DOCUMENTS

| | | |
|---|---|---|
| 6,665,715 B1 | 12/2003 | Houri |
| 6,871,076 B2 | 3/2005 | Samn |

(Continued)

*Primary Examiner* — Daniel A Hess
(74) *Attorney, Agent, or Firm* — Charles A. Rattner

(57) ABSTRACT

QR codes or the like are used in hardlink applications, by which different users may receive different information in response to a user's interaction with a touchpoint. The content delivered to a particular user in response to a hardlink code or a presented hyperlink may be dependent on the time of the scan, the geographic location of the user, a weather condition at the geographical location, personal information associated with the user, a number of previous scans of the code by prior individuals, and any combination of the these or other variables, which may be determined by an originator of the QR code or other party. User devices may be re-directed to alternate content or network addresses based on one or more programmed conditions.

40 Claims, 20 Drawing Sheets

Related U.S. Application Data continuation of application No. 16/421,498, filed on May 24, 2019, now Pat. No. 10,958,740, which is a continuation of application No. 15/815,901, filed on Nov. 17, 2017, now Pat. No. 10,305,997, which is a continuation of application No. 15/154,538, filed on May 13, 2016, now Pat. No. 9,826,049, which is a continuation-in-part of application No. 14/936,643, filed on Nov. 9, 2015, now Pat. No. 9,405,844, which is a continuation-in-part of application No. 13/799,446, filed on Mar. 13, 2013, now Pat. No. 9,183,315, which is a continuation of application No. 13/040,208, filed on Mar. 3, 2011, now Pat. No. 8,413,884, said application No. 14/936,643 is a continuation-in-part of application No. 14/104,755, filed on Dec. 12, 2013, now Pat. No. 9,224,157.

(60) Provisional application No. 61/736,140, filed on Dec. 12, 2012.

(51) Int. Cl.
*H04W 4/02* (2018.01)
*H04L 61/10* (2022.01)
*H04W 12/63* (2021.01)
*H04L 51/222* (2022.01)
*H04L 67/563* (2022.01)

(56) References Cited

U.S. PATENT DOCUMENTS

| | | | |
|---|---|---|---|
| 6,937,572 | B1 | 8/2005 | Egan et al. |
| 7,437,444 | B2 | 10/2008 | Houri |
| 7,873,710 | B2 | 1/2011 | Kiley et al. |
| 8,145,568 | B2 | 3/2012 | Rackley, III et al. |
| 8,413,884 | B2 | 4/2013 | Lim et al. |
| 9,183,315 | B2 | 11/2015 | Lim et al. |
| 9,224,157 | B2 | 12/2015 | Lim et al. |
| 9,405,844 | B2 | 8/2016 | Lim et al. |
| 9,826,049 | B2 | 11/2017 | Lim et al. |
| 10,305,997 | B2 | 5/2019 | Lim et al. |
| 10,958,740 | B2 * | 3/2021 | Lim ............... H04L 67/18 |
| 11,082,506 | B2 * | 8/2021 | Lim ............... H04L 51/20 |
| 11,089,120 | B2 * | 8/2021 | Lim ............... H04W 12/77 |
| 2007/0228148 | A1 | 10/2007 | Rable |
| 2008/0214157 | A1 | 9/2008 | Ramer et al. |
| 2010/0005489 | A1 * | 1/2010 | Losey ............ H04N 21/812 725/38 |
| 2010/0133332 | A1 | 6/2010 | Rathus |
| 2019/0281124 | A1 | 9/2019 | Lim et al. |
| 2020/0112614 | A1 | 4/2020 | Lim et al. |

\* cited by examiner

SmartCodes

View All | Select Group | Select Type | Select Status

| QR Code Name | Group/Campaign | Type | Status | Current URL | View Code |
|---|---|---|---|---|---|
| My Website | Personal | Static | Active | http://mysite.mccid.com | VIEW |
| Coupon1 | Pizza Shop | WEATHER | Active | http://10off.mccid.com | VIEW |

```
//this code is triggered when a new action node is dropped on the tree
//if it's on a line it inserts a new node private function dropNewAction(e:MouseEvent):void
{
                //check to see if it was dropped on a line
                var blnLine:Boolean = false;

for(var i:int = 0; i < globals.displayLines.length; i++){ if(globals.displayLines[i]==e.target.dropTarget.parent.parent){
                                blnLine=true;
                                break;
                                }
                    }

//if it was dropped on a line
                if(blnLine){

//set undo data
                                var blnTmp:Boolean=this.mCtrl.setUndoData(true);

//insert the new node into the tree
                                var bNodeDirection:String =
e.target.dropTarget.parent.parent.bNodeDirection;
                                var bNodeParent:NodeBase =
e.target.dropTarget.parent.parent.bNodeParent.bNode;
                                var bNewNode:NodeBase =
this.mCtrl.lCntrl.insertNode(bNodeParent, bNodeDirection,
this.newNodeDataMC(e.currentTarget.actionType));

//refresh tree
                                this.mCtrl.dUtil.refreshDisplay(this.mCtrl.lCntrl);

//show prop panel
                                this.showPropPanel(bNewNode, new MovieClip());

} else {
                                //we're not on a line, remove the clone

```
                //this code inserts a new node into the tree
public function  insertNode(_parentNode:NodeBase, childDirection:String,
_newNodeDataClass:MovieClip):NodeBase{

//make new node
                var bNewNode:NodeBase = new NodeBase();
                bNewNode.setnodeTypeProperties(_newNodeDataClass,
globals.nodeTypeID_Action);//sets the node type and it's action
                bNewNode.setNodeID(globals.utils.newDisplayID());

//create a new data object for the new node and give it an ID
bNewNode.getnodeTypeProperties().common.setNewNodeData(globals.utils.newD
ataID());
                //this gets the destination of the parents right path to be the new
destination node
                var parentsDefaultDestination:NodeBase =
this.getRightPathDestination(_parentNode);
                var parentUrl:String =
parentsDefaultDestination.getnodeTypeProperties().getNodeData().url;

//make a new destination node but assign the parnets right path
destinaion data
                var newDest:NodeBase = new NodeBase();
                newDest.setNodeID(globals.utils.newDisplayID());//needs a unique ID
in the limbz tree so we use our intneral ID + the original ID
                newDest.setnodeTypeProperties(new Destination(),
globals.nodeTypeID_Destination);//new destination
                newDest.getnodeTypeProperties().setNewNodeData(newDest.getNo
deID(),"");
                newDest.getnodeTypeProperties().getNodeData().url = parentUrl;

if(childDirection=="right"){
                        //right/default node or the true path
                bNewNode.setRightNode(_parentNode.getRightNode());
                        bNewNode.setLeftNode(newDest);
                        _parentNode.setRightNode(bNewNode);
                } else if(childDirection=="left"){
                        //left/down node or the false path
                bNewNode.setRightNode(_parentNode.getLeftNode());
                        bNewNode.setLeftNode(newDest);
                        _parentNode.setLeftNode(bNewNode);
                }
                return bNewNode;
}
```

FIG. 21

METHOD AND APPARATUS FOR DYNAMICALLY PRESENTING CONTENT USING AN INTERFACE FOR SETTING CONDITIONAL NETWORK DESTINATIONS

CROSS-REFERENCE TO RELATED APPLICATIONS

This application claims priority under 35 U.S.C. § 120 as a continuation of U.S. patent application Ser. No. 16/542,655 entitled METHOD AND APPARATUS FOR DYNAMICALLY PRESENTING CONTENT USING AN INTERFACE FOR SETTING CONDITIONAL NETWORK DESTINATIONS filed in the name of Lim et al. on Aug. 16, 2019, issued as U.S. Pat. No. 11,089,120 on Aug. 10, 2021, which claims priority under 35 U.S.C. § 120 as a continuation of U.S. patent application Ser. No. 16/421,498 entitled METHOD AND APPARATUS FOR DYNAMICALLY PRESENTING CONTENT USING AN INTERFACE FOR SETTING CONDITIONAL NETWORK DESTINATIONS filed in the name of Lim et al. on May 24, 2019, issued as U.S. Pat. No. 10,958,740 on Mar. 23, 2021, which claims priority under 35 U.S.C. § 120 as a continuation of U.S. patent application Ser. No. 15/815,901 entitled METHOD AND APPARATUS FOR DYNAMICALLY PRESENTING CONTENT USING AN INTERFACE FOR SETTING CONDITIONAL NETWORK DESTINATIONS filed in the name of Lim et al. on Nov. 17, 2017, issued as U.S. Pat. No. 10,305,997 on May 28, 2019, which claims priority under 35 U.S.C. § 120 as a continuation of U.S. patent application Ser. No. 15/154,538 entitled METHOD AND APPARATUS FOR DYNAMICALLY PRESENTING CONTENT USING AN INTERFACE FOR SETTING CONDITIONAL NETWORK DESTINATIONS filed in the name of Lim et al. on May 13, 2016, issued as U.S. Pat. No. 9,826,049 on Nov. 21, 2017, which, in turn, is a continuation-in-part of U.S. patent application Ser. No. 14/936,643 entitled METHOD AND APPARATUS FOR DYNAMICALLY PRESENTING CONTENT IN RESPONSE TO USER INPUTS filed in the name of Lim et al. on Nov. 9, 2015, issued as U.S. Pat. No. 9,405,844 on Aug. 2, 2016, which, in turn, claims priority under 35 U.S.C. § 120 as a continuation-in-part of U.S. patent application Ser. No. 13/799,446 entitled METHOD AND APPARATUS FOR DYNAMICALLY PRESENTING CONTENT IN RESPONSE TO SUCCESSIVE SCANS OF A STATIC CODE filed in the name of Lim et al. on Mar. 13, 2013, which issued as U.S. Pat. No. 9,183,315 on Nov. 10, 2015, which in turn claims priority as a continuation of U.S. patent application Ser. No. 13/040,208 entitled METHOD AND APPARATUS FOR DYNAMICALLY PRESENTING CONTENT IN RESPONSE TO SUCCESSIVE SCANS OF A STATIC CODE filed in the name of Lim et al. on Mar. 3, 2011, which issued as U.S. Pat. No. 8,413,884 on Apr. 9, 2013; the '643 application above further claiming priority under 35 U.S.C. § 120 as a continuation-in-part of U.S. patent application Ser. No. 14/104,755 entitled METHOD AND APPARATUS FOR PRESENTING CONTENT IN RESPONSE TO USER INPUTS USING DYNAMIC INTELLIGENT PROFILING as filed in the name of Lim et al. on Dec. 12, 2013, which issued as U.S. Pat. No. 9,224,157 on Dec. 29, 2015, which in turn claims priority under 35 U.S.C. § 120 as a continuation-in-part of U.S. patent application Ser. No. 13/799,446 and its parent applications as above, and further claims priority under 35 U.S.C. § 119 to U.S. Provisional Patent Application Ser. No. 61/736,140 entitled METHOD AND APPARATUS FOR DYNAMIC INTELLIGENT PROFILING filed in the name of Lim et al. on Dec. 12, 2012, the entirety of each of the foregoing applications being incorporated by reference. This application is further related to U.S. patent application Ser. No. 16/542,567 entitled METHOD AND APPARATUS FOR DYNAMICALLY PRESENTING CONTENT IN RESPONSE TO SUCCESSIVE SCANS OF A STATIC CODE filed in the name of Lim et al. on Aug. 16, 2019, which issued as U.S. Pat. No. 11,082,506 on Aug. 3, 2021.

TECHNICAL FIELD

This disclosure generally relates to data processing, and in particular it relates to receiving information over a computer or telecommunications network by scanning or otherwise entering codes displayed in the real world or online, such as barcodes, quick response (QR) codes, data representations, and other symbologies.

BACKGROUND OF THE DISCLOSURE

One and two-dimensional barcodes, and other symbologies, have become ubiquitous throughout the global marketplace, particularly with respect to product or item identification, and expediting merchant transactions involving the same. For example, it has long been common practice to include a barcode or similar symbology on product packaging. The symbology includes encoded information that identifies the product in a manner recognizable by a computer. The symbology may be scanned by a barcode reader, which, in turn, decodes the symbology, thereby identifying a purchased product or the like to the computer or a user.

While one-dimensional (1-D) barcodes rose to prominence since their introduction in the 1970's, two-dimensional (2-D) barcodes have since been developed, which boast the capacity to store greater amounts of information than its predecessors. Such 2-D barcodes are now prevalent, for example, in mail and package delivery, as well as many other industries.

One particular category of 2-D barcodes, referred to collectively in the marketplace as Quick Response (QR) codes, have gained rapid acceptance over the past decade with the proliferation of smart cellular telephones and other personal data or communication devices. Although initially used for tracking parts in vehicle manufacturing, QR codes are now used in many diverse areas, such as commercial tracking applications, as well as convenience-oriented applications aimed particularly at smartphone users. QR codes can be used to display text to the user, add contact information to a user's device, open a web page, or compose a text message or electronic mail message. Users can also generate and print their own personalized, data-encoded QR code and post it at various real-world locations or sites on the Internet. QR codes oftentimes are used to store network or telephone communication network addresses, such as a link to a particular uniform resource locator (URL) on the Internet, or other computer network address.

QR codes may appear in magazines, on signs, buses, business cards, or on just about any object or projection that individuals may come across in the real world. Those having a smartphone equipped with a camera and an appropriate code reader software application can then scan the image of the QR code and receive the information encoded thereby. The linking of data to physical objects in this manner is commonly referred to as a hardlink or a real-world hyperlink.

In all prior uses of barcodes and like symbologies, there has been one consistent goal, namely to provide a means by which information returned from a scan of the code is consistent each and every time the code is scanned. For example, when a barcode on a product is scanned, the same product information is returned to users scanning that code every time. The Applicants now introduce a distinguishable use of symbologies, such as QR codes, in hardlink applications. The techniques employed for QR Codes as disclosed herein are readily applicable to other types of user inputs to mobile or other computing devices.

SUMMARY OF THE DISCLOSURE

The present disclosure enables a method and apparatus for presenting dynamic content in response to successive indications, acknowledgements, inputs or scans of a static, unchanging, hardlink symbol or code that is visually displayed to users or consumers at one or more real-world, physical, geographic locations or online. In particular, one aspect of the disclosure includes a method performed by a network-accessible computer server system in communication with wireless devices of users over a wireless communication network, such as a cellular telephone network. The computer server system includes electronic memory for storing a plurality of separate merchant site addresses in computer-readable format. The electronic memory further stores one or more rules for selecting a merchant site address from the plurality of separate merchant site addresses for transmission to a wireless device of a user over the wireless communication network in response to an indication of the hardlink code from the wireless device. Such rules are dependent on data determined from such received indications. For example, when an indication of the hardlink code is received from a wireless device of a user, the system determines data that includes (i) an identification of the hardlink code scanned by the user, and at least one of: (ii) a time of the indication, (iii) the geographic location of the wireless device at the time of the indication, and (iv) a weather condition at the geographic location. Applying this data to the rules, the system selects a merchant site address from the plurality of merchant addresses and transmits the selected merchant site address, or content therefrom, to the wireless device of the user in response to the indication. The user may then enter into a transaction with the merchant in a variety of manners. A user interface is provided that enables an administrator or other user to program conditional re-direction of web traffic to one or more alternate network destinations based on the above and other useful conditions.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 7-12 are screenshots depicting an exemplary manner in which rules may be established and applied to determine content to be delivered to a user in response to a scan of the QR code, or the like, according to the present disclosure.

FIG. 20 depicts exemplary programming for setting a new conditional re-direction destination in accordance with the present disclosure; and FIG. 21 depicts exemplary programming for setting one or more supplementary conditional re-direction destinations in accordance with the present disclosure.

DETAILED DESCRIPTION OF THE SPECIFIC EMBODIMENTS

Referring now to FIGS. 1-21, wherein similar components of the present disclosure are referenced in like manner, various embodiments of a method and system for selecting and dynamically presenting content in response to successive indications, acknowledgements, inputs or scans of a static, hardlink code are disclosed.

Figure 1:
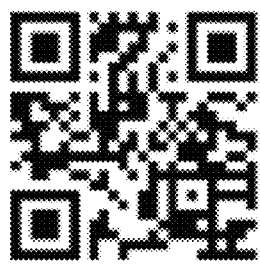
FIG. 1 is an example of a code, such as a QR Code or smartcode, for use with various embodiments of the present disclosure.

Turning now to FIG. 1, there is depicted one type of QR code that may be used with the present disclosure. Information is typically encoded within such a QR code in two-dimensional formats in a variety of manners that are well known in the art. The data encoded in the QR Code, of course, can not be changed since the underlying data is typically used in the image generation of the code itself. Thus, every time that the QR code is scanned the same data will be decoded from the image. In various embodiments of the present disclosure, it should be recognized that the QR code may encode a computer network address, such as a Uniform Resource Locator (URL) address on the Internet. It should also be readily appreciated that any type of data, code or symbology may be used in place of a QR code, such as a one-dimensional barcode, a two-dimensional barcode, a dataform, a dataglyph, alphanumeric text, a photographic image, or any other symbologies heretofore known or later developed.

Figure 2:
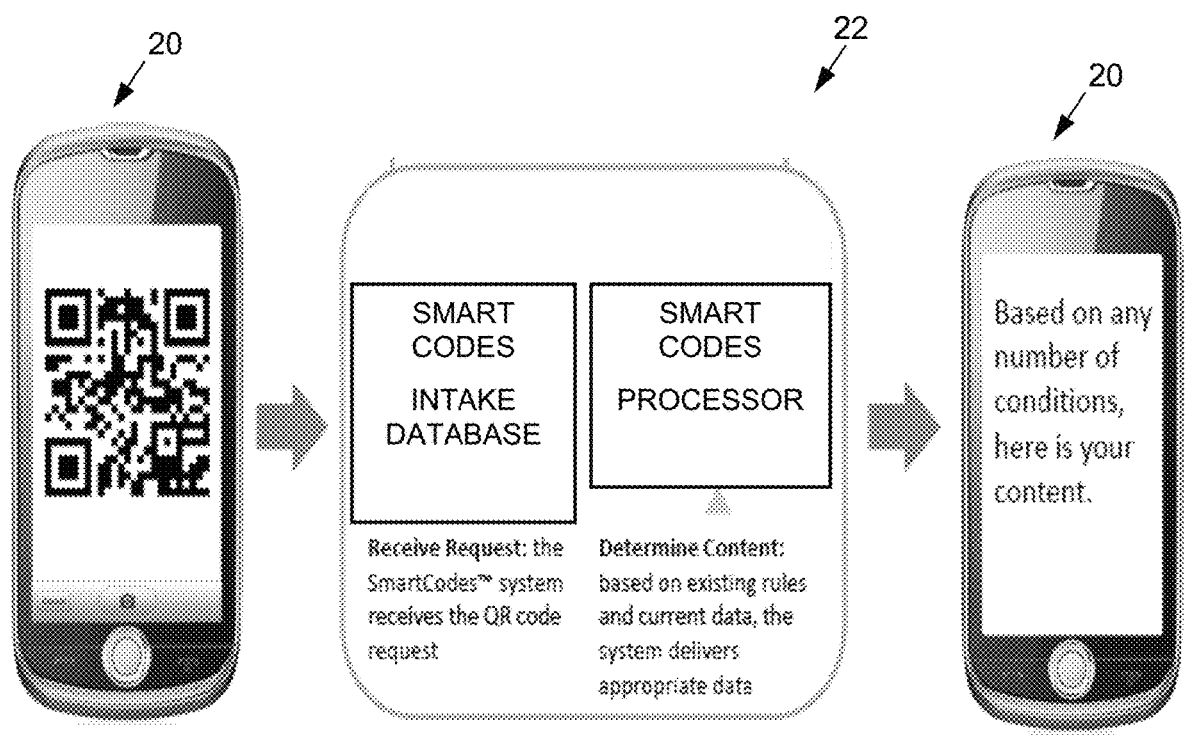
FIG. 2 is a pictorial representation of a process of scanning a code and receiving dynamically-selected content according to the present disclosure.

As depicted in FIG. 2, a consumer may use a wireless device 20 to scan, image or otherwise input a code, such as a QR code, encountered in the real world. The wireless device 20 may be any type of device, heretofore known or later developed, which is operable to receive an input, image or scan of a code by a consumer, and which further includes a transmitter and a receiver for communicating signals over a wireless communications network. In various embodiments, the wireless device 20 may be a cellular telephone having an imaging device, such as a still or video camera. The wireless device 20 may also include an interface, such as a browser application, for accessing the Internet or other computer network. Examples of such web browsers include SAFARI, INTERNET EXPLORER and FIREFOX. The wireless device 20 may also include appropriate native hardware and software to send and receive SMS or text messages, and electronic mail messages. A proprietary application may optionally be provided on the wireless device 20 to perform the scanning and/or web interface functions described herein. The wireless device 20 may additionally include appropriate hardware and software for interacting with a global positioning system (GPS), such that the wireless device 20 may determine its geographic location. Additionally, the wireless device 20 may include any of a variety of software applications for imaging and decoding a code or symbol, such as a QR code. Examples of such code-reading applications include NEOREADER, MOBILETAG and CODE READER. Examples of cellular telephones on the market today that are equipped with the features above include the IPHONE, BLACKBERRY, and ANDROID smartphones.

The wireless device 20 is operable to communicate bi-directionally with a computer server system 22 over any of a variety of communications networks. Such communications networks may include a cellular telephone network, a cellular data network and a wireless computer network of the type operated by VERIZON and AT&T. The communication network may provide access to any variety of hard-wired or wireless computer networks now known or heretofore developed, including, without limitation, local area networks, wide area networks, fiber optic networks, satellite communication networks, as well as the World Wide Web.

The computer server system 22 may be one or a group of distributed or centralized network computer servers. Such servers, like any common personal computer, include well-known processors, electronic memory, network communication hardware, user interfaces, input/output devices, operating system software, and application software suitable for accomplishing the functions described herein. A suitable computer server system 22 may be one or more enterprise network servers of the type commonly manufactured by CISCO, DELL and IBM. The computer server system 22 may be configured to perform the functionalities described herein through suitable programming in C++, JAVASCRIPT or the like, and may include databases and database management software, for example, of the type distributed by ORACLE. The computer server system 22, in conjunction with the hardware and software described above, may be programmed to act as an intelligent proxy with a decision engine that includes one or more rules, generated by a distributor of QR codes or the like, which determine the content to deliver to the wireless device 20 in response to an indication of a code received therefrom. Such rules will be described in more detail later below. The computer server system 22 may operate a website on the Internet for interfacing with wireless devices 20. Based on established and updated rules, the computer server system 22 will deliver content to the wireless device 20, as described further below.

Figure 3:
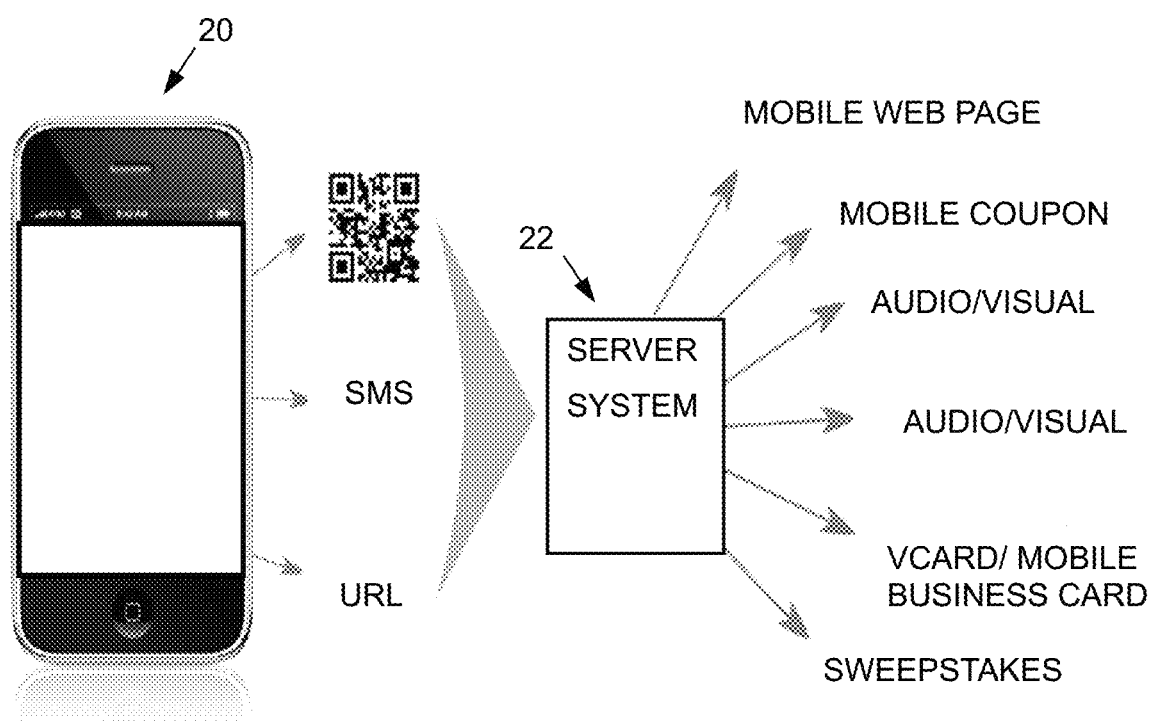
FIG. 3 is a pictorial representation of a process of scanning a code, sending a Short Message Service (SMS) text message, or entering a URL displayed in a real-world location and receiving dynamically-selected content according to the present disclosure.

With reference to FIG. 3, the wireless device 20 may be used to image or scan a code, and upon decoding of the same, to initiate a communication with a website operated by the computer server system 22. In additional embodiments, however, such communications may instead be initiated by the user transmitting a code to a specific SMS address via a text message, or the like. For example, a billboard or like display at a physical location may present a code and/or a printed message, such as Text <alphanumeric code> to <SMS address>. When the user transmits the code to the SMS address with the wireless device 20, the computer server system 22 may then determine what content to deliver to the wireless device 20 based on the aforementioned rules. Alternatively, or in addition thereto, the user may be presented with a website or URL to enter into a browser of the wireless device 20. When the wireless device 20 accesses the website or sends an e-mail, the computer server system 22 may determine the content to be delivered in reply according to the aforementioned rules.

In an alternate embodiment, the input of the code could be a photograph or image of an offer, product, storefront, or any other image taken by the camera of the wireless device 20 from which one or more image features may be recognized by the system 22 using known image recognition technology. Examples of such technology include software and services provided by LOOK THAT UP (LTU) TECHNOLOGIES, SNAP TELL or GOOGLE GOGGLES. In addition, the input may come from a device such as GOOGLE GLASS or other augmented reality platforms. A rule may be established in the computer server system 22 that when a given feature is identified in an image submitted by the user, particular content is to be delivered in response.

In response to a scan or any other indication of a code received by the computer server system 22, the computer server system 22 may return any of a variety of content. This includes a merchant web site address or web page, a coupon from a merchant, audio/video content, photographs, business contact information, confirmation of sweepstakes entry or the like. Such content is to be delivered according to the established rules. In various embodiments, the content to be delivered in response to the code received from a user may be determined as follows. All code inputs may be initially directed from wireless devices 20 to the computer server system 22. Based on the code, content, or other information, and in accordance with the programmed rules, the computer server system 22 may query to an internal database using one or more parameters associated with or parsed from the received code. The parameters are passed and the database results or content may be delivered to the wireless device 20. The content may, in certain instances, be a redirection to a merchant web site or the like. One of ordinary skill in the art will appreciate from the foregoing that dynamic redirection of user's browsers to desired web site location can be accomplished in this manner without placing cookies or other tracking implementations on each user's wireless device 20, as was customarily done in the prior art.

Figure 4:
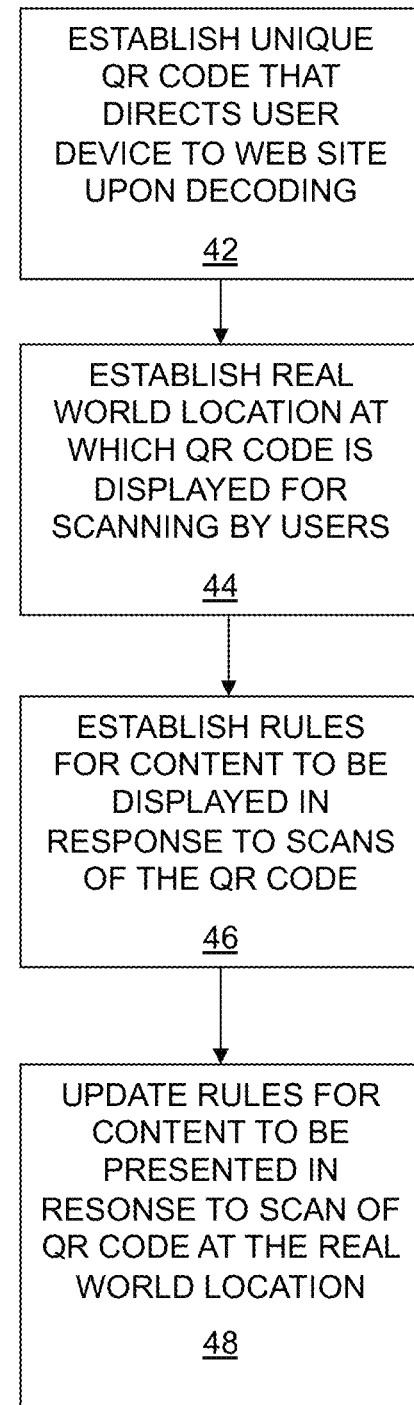
FIG. 4 is an exemplary method performed by a QR code distributor or the like for establishing and updating rules for dynamically presenting content in response to a scan of a QR code by a user according to the present disclosure.

Turning now to FIG. 4, therein is depicted an exemplary method 40 for establishing and updating rules that dynamically determine content to be presented in response to a scan or other entry of a hardlink code by a wireless device 20. At the outset, a QR code distributor or other operator of the computer server system 22 establishes a unique code, such as that depicted in FIG. 1, in which a web site address or URL is encoded (step 42). The encoded URL is the network address of the computer server system 20. The following steps of the method 40 are then performed in any suitable order.

Next, the unique code is visually displayed in the real world to users at one or more geographical locations (step 44). Such locations may include any area or object on which advertising may normally appear, such as billboards, newspapers, magazines, signs, posters, display screens, product packaging or any other usable location. The geographic location or locations at which the code is displayed may be noted and stored in the electronic memory of the computer server system 22.

The operator of the computer system server 22 that distributes the codes may then establish rules for the content to be delivered in response to a scan or other indication of the code from a wireless device (step 46). The rules then may be updated, periodically, occasionally and/or as needed (step 48).

The rules that are central to the operation of the present disclosure may be based on data variables that are collected from, or in response to, an indication of a scan or entry of a hardlink code that is displayed to users in the real world. Certain variables, which are one focus of this disclosure, are those that also readily influence purchasing decisions made by consumers. Some of the most universal variables that globally affect purchasing decisions are: (i) time of day or date, (ii) a location of the consumer, and (iii) prevailing weather conditions at the geographical location of the consumer. Accordingly, it is a goal of the present disclosure to leverage the content that is delivered to a consumer in response to scan or entry of a code based on at least these three variables.

For example, certain merchants may be interested in advertising using the code only during times of the day that the merchant is open for business. Thus, a rule may be established that if a particular code is scanned by a user during the business hours of a merchant, then that merchant's content will be delivered in response to a scan or entry of that particular code. It is contemplated that certain hours or dates will be more preferential to certain merchants, and fees charged to merchants for delivering content at such preferred times may be adjusted accordingly. The ability to deliver different content based on the time of day or date ranges in response to separate scans or entries of the same static hardlink code has not heretofore been described.

In an additional example, a single hardlink code may be distributed to and displayed in multiple locations. If the hardlink code is scanned by a user at a certain location, then the computer server system 22 may determine the location of the user (based on the GPS of the wireless device 20 or the known location of the hardlink code) and deliver content designated for that location based on the rules.

In a further example, certain merchants may notice increased demand during a particular weather condition. Clothiers, for one, may notice that consumers purchase more coats when it is raining. Accordingly, a rule may be established that if it is raining at the geographical location of the user, then certain content is to be delivered in response to a scan or other entry of the visually displayed code. The computer server system 22 may access weather information for the geographic location of the user by accessing or querying any number of weather sites on the Internet, such as WEATHER.COM, or may maintain its own database of prevailing or predicted, local or regional weather conditions for this purpose.

One or more such rules may be applied separately or in succession, and may have a hierarchical priority or the like to resolve any conflicts that may arise between the established rules. The rules may be updated and adjusted from time to time based on consumer and vendor activity and preferences.

In addition to rules based on a time, location and weather as described above, a wide variety of other variables may also be established. For example, content delivery may be based on the number of times that a hardlink code is scanned by one or more users. In such cases, the content delivery may be restricted to a certain number of deliveries, based on how many deliveries have been paid for by a particular merchant or other criteria.

Content delivery may also be based on any information known about the user. For example, a user may register her wireless device 20 with the computer server system 22 by providing personal identification information (name, address, telephone number), demographic information, and the like. The user may be assigned a unique user identifier by the computer server system 22 in response to such registration. Alternatively or additionally, users need not register with the computer server system at all to be recognized thereby. Instead, a cookie or other identifier may be placed on the wireless device 20 when it interacts with the computer server system 22. Thus, user interactions with the computer server system 22 can be tracked anonymously, without any personal identification of the consumer or user, by use of such cookie or identifier.

Rules may be based on additional variables, such as a number of times users have received certain content. There may be a rule that overrides all previous established rules, such as delivering emergency notifications. The computer server system 22 may also provide end of range warning to indicate when certain rules are about to expire or reach their established, maximum threshold of delivery.

Figure 5:
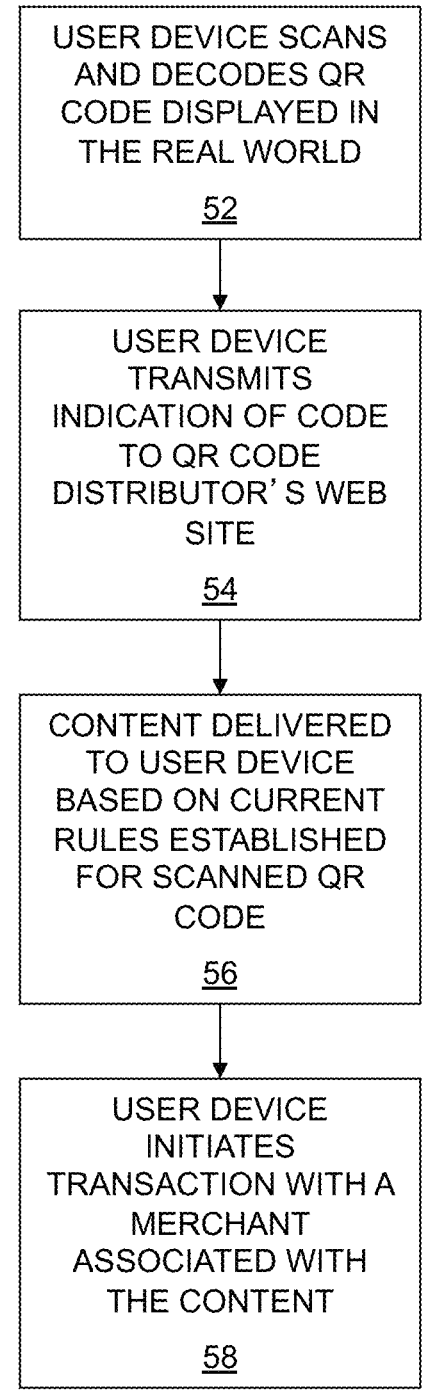
FIG. 5 is an exemplary method performed by a user for scanning a QR code or the like and receiving dynamic content in response thereto according to the present disclosure.

Turning now to FIG. 5, therein is depicted an exemplary method 50 performed by a user for scanning or entering a hardlink code and receiving dynamically-delivered content in response thereto. At the outset, a user encounters a hardlink code that is visually displayed at a geographic location, and uses the wireless device 20 to scan or otherwise input the hardlink code (step 52). The wireless device 20 then sends an indication of the code to the computer server system 22 over a wireless communications network (step 54). Where the code is a QR code or other symbology, the wireless device may decode the scanned code using appropriate decoding software applications. The decoded hardlink code will then provide a URL and direct the wireless device 20 thereto. The computer server system is programmed to receive the indication of the hardlink code from the wireless device 20 and determine variables associated with the indication, such as (i) a time that the scan, input or indication was generated, transmitted or received; (ii) the geographic location of the wireless device 20; and (iii) a weather condition at the geographic location. The computer server system will then apply the established rules for such variables and deliver the content to the wireless device 20 that is determined from the rules (step 56). Where the content is a redirection to a merchant web site or the like, the user will immediately be presented with, and may interact with, the merchant web site via the wireless device 20, and even enter into a transaction with the merchant (step 58). Alternatively, or in addition thereto, content may be delivered to the user that requires the user to physically present the content to the merchant at a merchant's real-world location. In other embodiments, more than one type of content may be offered to the user in response to a scan, and the user may select from two or more content delivery options, after which, the selected content is delivered.

A second user may scan the same code at the same location and receive the same or separate content as a prior user, dependent upon how the rules apply to the users' scans. In addition, the same code may be presented at multiple locations, and users at the various locations may receive the same or separate content in response to scans of the code, also as dependent upon the rules.

As evident from the foregoing, when any user scans a hardlink code using the wireless device 20 with appropriate decoding software or the like, the hardlink code is decoded and the wireless device is initially directed to a network address of the computer server system 22 by the decoded information. When the wireless device 20 communicates an indication of the scan of the hardlink code to the computer server system 22, the system 22 then determines certain variables from the indication, such as one or more of: (i) an identification of the hardlink code that was scanned or otherwise entered by the user; (ii) a time that the scan was performed, transmitted or received; (iii) a geographic location at which the user performed the scan, which may be determined from position/GPS information received from the wireless device, from stored information regarding the location of the hardlink code that was scanned, or a variety of other manners; and (iv) a weather condition at the geographic location, which may be determined by querying a weather site or the like using the geographic location information. Other variables may likewise be determined from the indication by the computer server system 22. Based the determined variables, and one or more programmed rules for selecting content based on the rules, the computer server system 22, immediately selects and delivers content required by the rules to the wireless device 20 in response to the indication of the scan, in such a manner that the user may not even be aware of the initial contact with the computer server system 22. The content may be a redirection to a merchant website or the like. After content delivery, the user may interact with the delivered content as desired on the wireless device 20. Different users may thus receive different content though they scan the exact same hardlink code using their wireless devices 20 in the real world. Finally, users may enter a code in any of a variety of manners other than scanning. To accommodate those users not having cameras in their portable communication devices, for example, a hardlink code may alternatively or additionally be provided with an SMS address to which a code may be sent, or a URL to be entered into a web browser of the user's device.

Figure 6:
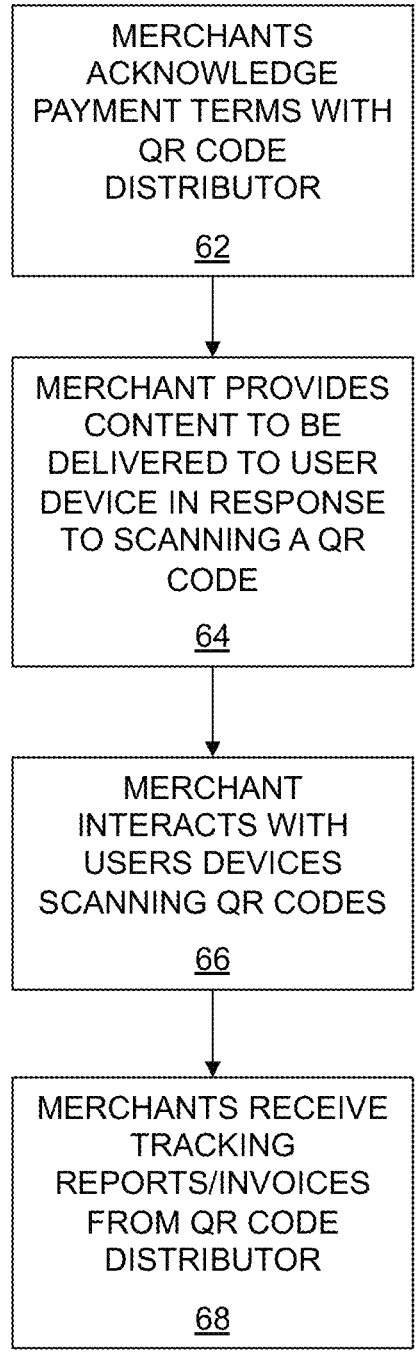
FIG. 6 is an exemplary method performed by a merchant for having its merchant site address identified to a user in response to a scan of a QR code, or the like, according to the present disclosure.

Referring now to FIG. 6, therein is depicted an exemplary method 60 performed by a merchant for having its merchant site address or content identified to a user in response to a scan or entry of a hardlink code. The method 60 may preferably be performed using suitable merchant servers in communication with the computer server system 22 over a computer or communications network. Initially, the merchant determines or identifies those conditions under which they would like their content delivered to users in response to the scan or entry of a code. The merchant may indicate time of day, date range, geographic location, weather conditions, user attributes and the like as conditions for deliver of their content. These variables are then used to generate rules under which the merchant content is to be delivered to a wireless device 20 in response to a scan of a hardlink code. The user and the QR code distributor may then agree to payment terms for delivery of content, such as price per content delivery or number of deliveries (step 62). The merchant then provides or otherwise designates its content that is to be delivered in response to a scan or entry of a code by a user (step 64). When users receive the merchant delivery they may, for example, interact with the merchant server and even enter into a transaction (step 66). The computer system server 22 may be programmed to track the number of content deliveries made according to the terms with a merchant over a given period and the merchant may receive reports and invoices concerning such deliveries (step 66).

In the case where multiple merchants create conflicting conditions for delivery, the merchants may competitively bid for priority with respect to those variables. Alternatively, priority to certain variables or combination of variables may be presented on a first come, first served basis.

In addition to decisions made on content delivery, the computer server system 22 may maximize revenue for the system by presenting the highest-bid offers to users before lower bids from merchants. In addition, the system 22 will also attempt to maximize merchant interest in the system. For example, a merchant with a low bid may still have his offers delivered at low-revenue times by the system 22. Similarly, the system 22 may determine lower-revenue time slots, and make lower-rate offers to merchants for such time slots.

Turning now to FIGS. 7-12, therein are presented screen-shots of exemplary operator interfaces to the computer server system 22, which depict, in sequence, an exemplary manner by which rules may be established by an operator of the computer server system 22. The rules are then applied to determine content to be delivered to a user in response to a scan of the hardlink code. In FIG. 7, an initial summary screen is presented in which there are presented two exemplary hardlink code identifications (My Website and Coupon1). Summary information is presented on this initial screen, including (i) a group/campaign (i.e., merchant) to which the hardlink code belongs; (ii) a rule type (which may be either static or based on one or more dynamic variables) pertaining to the hardlink code; (iii) a status of the hardlink code (i.e., active or inactive); and (iv) a current URL or network address having content to be delivered in response to a scan of the hardlink code by a wireless device 20. The operator has the opportunity to view or edit the rules established for hardlink codes, or to view reports associated with the codes.

Figure 8:
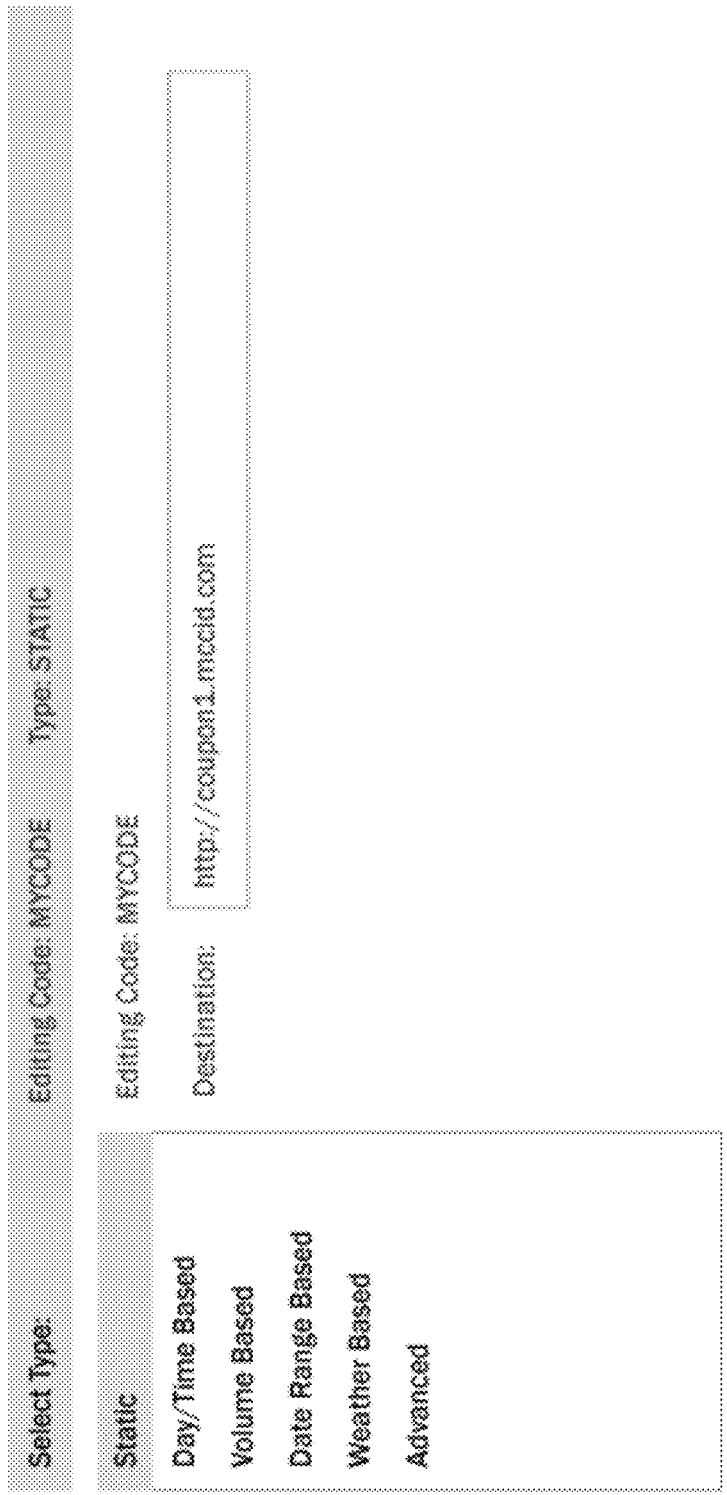

In FIG. 8, an exemplary editing screen of the operator interface of the computer server system 22 is presented. When rules for a hardlink code are enabled, they may be static (i.e., the rule says the same content is always to be delivered in response to a scan of the code by users). Instead, the rules may be dynamic, and based on previously mentioned variables, such as: day, time of time, current weather conditions, number of scans of the code performed by users, or other available options.

FIG. 9 presents an exemplary variable entry screen that is presented to an operator in response to a selection of a volume-based rule (as presented as an option in FIG. 7) for a given hardlink code. A volume-based rule may be based on number of scans (i.e. hits) of the code. First content may be delivered for the first X number of hits and second content may be delivered for the next Y number of hits. Options may be selected to indicate to the operator when an end range is being reached rule, or that the criteria are to be repeated upon conclusion of an end range. Other combinations or types of volume-based rules may also be employed.

FIG. 10 presents an exemplary variable entry screen that is presented to an operator in response to a selection of a weather-based rule (as presented as an option in FIG. 7) for a given hardlink code. The weather rule may be dependent on temperature and/or condition (rainy, snowy, cloudy, sunny). A combination of temperature range and weather condition variables may likewise be designated for particular content delivery.

FIG. 11 presents an exemplary variable entry screen that is presented to an operator in response to a selection of a time-of-day-based rule (as presented as an option in FIG. 7) for a given hardlink code. Content delivery may be based on one or more time ranges. For example, a rule may state that between the hours of 12 AM and 6 PM on Mondays, Content X is to be delivered in response to a scan of the designated hardlink code by a user, while between 6 PM and 12 AM on Mondays, Content Y is to be delivered.

Figure 12:
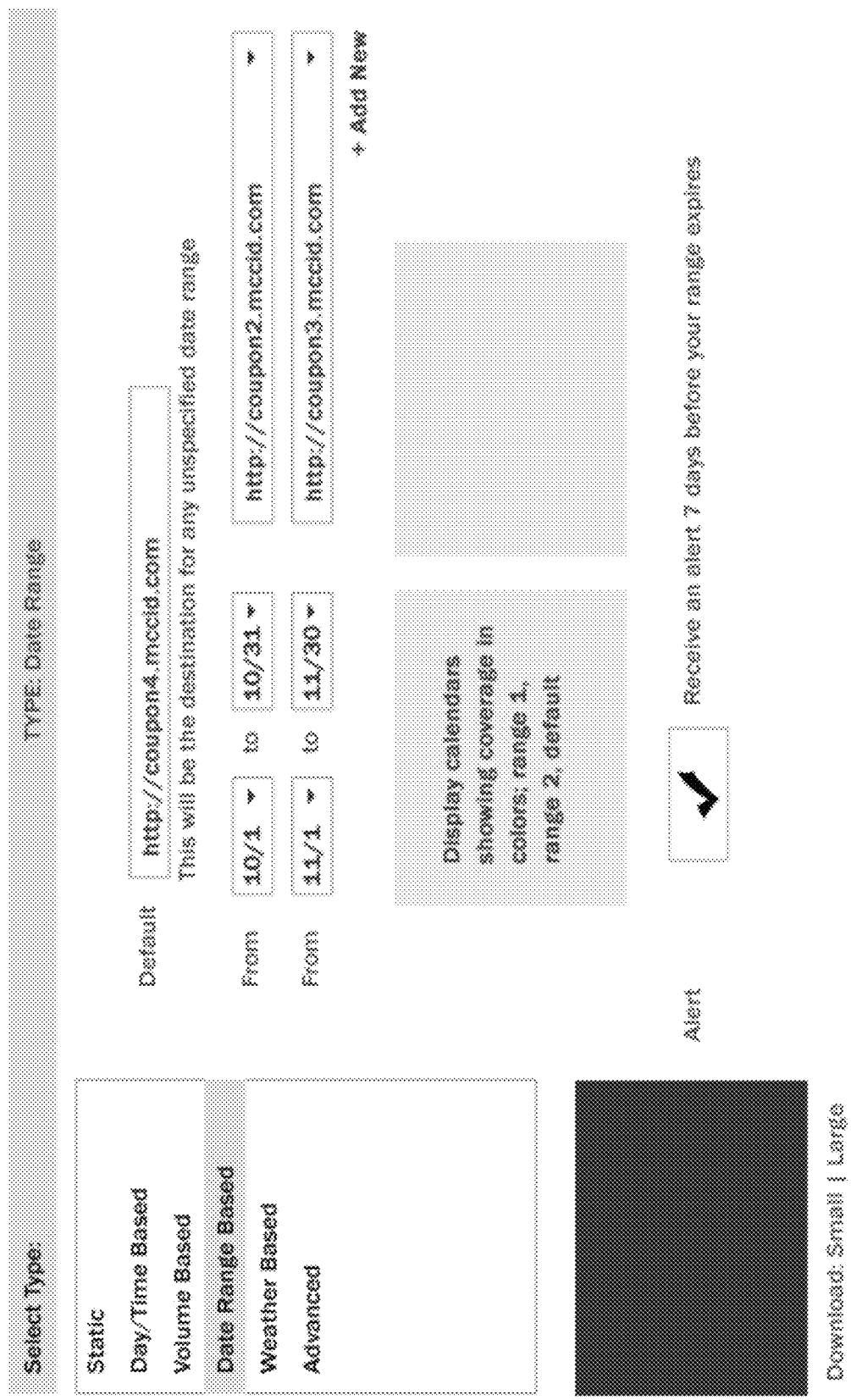

FIG. 12 presents an exemplary variable entry screen that is presented to an operator in response to a selection of a date range-based rule (as presented as an option in FIG. 7) for a given hardlink code. Content may be delivered based on one or more date ranges. For example, a rule may state that between the dates of Oct. 1, 2011 and Oct. 31, 2011, Content X is to be delivered in response to a scan of the designated hardlink code by a user, while between Nov. 1, 2011 and Nov. 30, 2011, Content Y is to be delivered.

Based on the foregoing, it is readily apparent that any number of rules and combination of rules may be applied to determine content to be delivered in response to a scan of a hardlink code by a consumer or individual. The rules may be based on variables associated with a scan of a hardlink code and/or based on payment terms or bids from merchants for content delivery under predetermined conditions. In certain embodiments, the rules may be based on the price paid by merchants for presenting their content to users in response to scans, the proximity of a user scanning a code to a particular merchant, or preferences of the users as established by submitted preference information and/or monitoring of the user's scanning patterns that may optionally be performed in a variety of known manners.

The methods and systems described in the foregoing enable a new manner of leveraging advertising space or the like. Instead of a single physical display being dedicated to one advertising campaign or message, it can be dedicated to a wide variety of campaigns simultaneously. Users scanning a given hardlink code will be dynamically served content that are based on rules associated with the code and variables associated with the scan of the hardlink code by various users. Accordingly, certain novel methods of determining content delivery based on scans of hardlink codes have been presented herein. Such methods and systems do not preclude all uses of QR codes or other codes for marketing or messaging purposes, including those that heretofore existed. However, such methods and systems are readily distinguishable in that, in the prior art, the use of QR codes and the like are generally intended to serve the same information each and every time a code is scanned by various user devices, wherein in the present disclosure, different content may be dynamically delivered to different users, or the same user at different times, based on any number of variables and rules established for the hardlink code, all without ever having to replace or update the display of the hardlink code in the real-world after it has been positioned.

Various possible uses of the methods and systems described herein will now be described. In a first example, a single merchant may wish to provide multiple sale offers to consumers at a specific retail location. There may be, for example, ten different hardlink codes located throughout the store, each of which having separate offers designated by the rules established for those codes. When a user scans a particular one of the codes located in the toy department, the user may receive one of many available offers: on a summer day, the user may receive a digital coupon or offer for 10% off of rollerblades and bicycling accessories in the toy department.

In a second example, a store puts a permanent QR code in their entranceway, offering users the ability to scan it on every visit for the daily special. One day the store only has 100 of a particular offer available. The store sets their volume range so that after 100 scans, the system is programmed to change the offer.

In a third example, a shopping mall or other like location with multiple retail storefronts may have a single hardlink code displayed in locations around the mall. Merchants within the mall can pay to have their content delivered from scans at certain locations within the mall or at particular times/dates. On a slightly larger scope, offers may be displayed for example on public transportation or other public locations throughout a city, county, state or even countrywide. Merchants within the given region can pay or bid to have their content delivered under various conditions from one or more of the city-wide hardlink codes.

On a busy city street, a company places a QR code with the caption 'Local deals on this street'. All merchants on the street are given a login to an interface with the computer server system 22. Using the interface, merchants can log in, modify their offers in real-time, adjust their current bid for impressions, select specific time or days, and set weather conditions.

As a final example, a merchant has an ongoing promotion revolving around their QR code. Shoppers can scan the hardlink codes presented in the merchant's store to receive offers or other promotions. However each day one shopper will win a cash prize based on a randomly selected scan that occurs between, for example, 4 PM and 6 PM, when traffic to the store tend to be typically slow. Upon noticing the promotion, shoppers are attracted into the store at that time to scan the hardlink code. The computer server system 22 may place a session variable, cookie, or other data tracking mechanism on the wireless device 20 of each shopper so that each has only one opportunity to win. As customers scan the code within the store, one shopper is chosen as an instant winner, randomly or based on designated variables. Where shoppers are registered with the merchant, instant win scans could become delayed win scans. For example, the merchant could have a promotion where shoppers are encouraged to scan a hardlink code from 4-6 PM. Since the shoppers are registered, the merchant may notify the winner via SMS to the user's cellphone, or in another suitable manner.

In embodiments where an identity of a user submitting a code to the computer server system 22 is known, various additional embodiments are possible. For example, it may be possible for an administrator to activate QR Codes in the field once they are placed at a location in the real world. Once a QR Code is placed, the administrator can scan the code at a first instance. The computer server system 22 may recognize that this is an initial scan of the code. The computer server system 22 may further identify the user as an administrator based on parameters passed with the scan, such as an identification of the administrator's user device (i.e. by machine address code (MAC) or cellphone number). The administrator can also access and update parameters, data and rules associated with the activated codes. Upon recognition of the administrator, the computer server system 22 may then activate the code so that content will be delivered to subsequent scanning users. The computer server system 22 may also determine the physical location of the QR Code from position or GPS data transmitted from the administrator's device.

In certain additional embodiments, where the identity of a user (such as demographic data, contact information, biographical data, and/or marketing preferences) are known or established (such as by submission of such data by web interface to the computer server system 22), the scanning activities of known users may be tracked and maintained in a database, and tracked users may receive customized content or other additional privileges or exclusive offers in response to scans of hardlink QR Codes. In certain circumstances where a user can be uniquely identified (by MAC address or the like), but the actual identity of the user is unknown or not provided, the activities of the user may instead be anonymously tracked, but in a manner that is otherwise similar to that for users with known identities. Scanning patterns may be tracked, directly or anonymously, and content delivery may be based on prior scanning activities of known users. In such manner dynamic content delivery can include a degree of intelligence by including rules that prevent delivery of certain content to a tracked user, even though such content would otherwise be called for by the established general rules. For example, where the user has previously received such content in response to an earlier scan, or has otherwise indicated preferences such that a particular content should not be delivered, the rules may over-ridden to select the next available content for delivery to that user.

The principles and functionality described in the foregoing with respect to hardlink codes can now be expanded to other useful media types and applications, either for separate use or in conjunction with hardlink codes. In particular, the inventors have now implemented systems that allow for single marketing piece, which may be provided in any of a variety of forms, and which may be viewed by millions of people, to provide a custom-tailored journey for each individual consumer who views the piece. Such systems and processes as now introduced, and sometimes referred to herein as DYNAMIC INTELLIGENT PROFILING (DIP), allow any party to customize each consumer's experience in terms of content or page destinations that are provided to consumers in response to consumer interaction with a touchpoint. For example, such dynamically served content or web page destination may be based on the aforementioned real-world conditions affecting the consumer at the moment, such as time, date, location and weather, as well as the consumers' past participation or exposure. DIP may be used with any mobile or computer network-based website, as well as any number of touchpoints, such as from packaging or other forms of media. The foregoing features of DIP are described in detail in commonly-owned co-pending U.S. patent application Ser. No. 14/104,755, the entirety of which is hereby incorporated by reference.

DIP will add tremendous value to all consumer interactions. Custom scenarios and triggers can be created to detect a specific pattern of consumer interaction, and then alter the content the consumer receives based on the interaction and conditions surrounding them. DIP will also allow marketers to analyze the results of all marketing efforts, both traditional and digital, to provide just-in-time offers and deliver the most relevant content via mobile and/or computer networks.

DIP may be implemented as plug-and play code that can be embedded in mobile or web sites and used with touchpoints such as hardlink codes, printed QR codes, SMS campaigns, social URLs (also known in the art as short URLs), advertising URLs, e-mail, and other print or online marketing initiatives. DIP will allow advertisers and marketers to create smarter mobile or web touchpoints that further enhance the consumer experience.

DIP enables marketers to know how consumers interact with their brand across all types of marketing campaigns. DIP knows the real-world conditions surrounding the consumer during these interactions. DIP works in real-time to collect mass consumer data while retaining individual user anonymity, making marketing analytics reactive. DIP uses this anonymous data to customize the experience, content and offers the consumer receives based on definable scenarios ad triggers as discussed further herein.

As used herein, a scenario is a set of conditions and values created by an administrator via a logic builder within the DIP software platform. Administrators can link together multiple if/then statements to create simple to complex conditions, or scenarios, which can be saved, named and reported at scheduled intervals. A scenario serves two purposes: (i) it can be simulated against historical traffic data, then saved as a report for analysis by marketers, or (ii) it can be married to a trigger, as described further herein, so that actions can be performed when a condition is met. Logic conditions included in building of scenarios may include: current date, local or global time, current weather conditions in a region (such as temperature), location/time zone, number of previous visits by a customer, touchpoint entry type (QR, SMS, social link, etc.), history of site visits or multiple site visits by a customer.

Triggers are actions to be performed as a result of established scenarios. When logic created within a scenario is met by a visiting consumer, a trigger is activated. The trigger is an action to be performed within the visitor's current session. For example, a trigger may be created by an administrator to redirect a visitor meeting the conditions of a scenario to a new URL or new content at an existing website, which are established for that scenario. Administrators can select and customize any one of the following actions as triggers: (i) change current URL (e.g., implement a redirection of a customer browser to an alternate content page from that being visited), (ii) show or hide a HTML DIV content overlay on current page (e.g., create an overlay on the current page being visited by the browser of the customer's device, which overlay may include image, video, text or the like), or (ii) dynamically create a content region at some place in the current page being visited).

A touchpoint, as used herein, is any method of entry to or selection of content performed by a customer or consumer, using their device, such as a computer or mobile communication device. Touchpoints should each have their own unique attributes so that traffic source through a touchpoint can be tracked. For example, an administrator of a marketing campaign may want to see the number of QR scans versus the number of SMS entries generated by consumers. A touchpoint may be any one of the following: a hardlink code, a QR code, a URL placed in an outbound SMS, a social URL (as used in in social posts such as on TWITTER), a URL (such as may be placed in an outbound email or email signature), a redirect code (to be placed in a website or mobile site to detect and redirect customer traffic), a hyperlink to an address on a computer network, text or photo or video or audiovisual information placed within an e-mail, an NFC-originated URL (as may be programmed into an NFC tag), a custom URL (as may appear in auto-signatures of electronic messages), a social media profile, radio advertisements, television advertisements, web video channels and the like. Touchpoints may also include any form of print media, product packing, marketing brochures and like collateral, billboards, storefront visual displays, and/or other visual presentations. Upon establishing a touchpoint, administrators should be able to select all of the conditions, scenarios, and triggers to be associated with such touchpoint. For example, a site owner may want to have four unique QR codes (for four print magazines), one redirect code (for her main website), and two social URLs.

DIP is a three part system that takes into account the real-world conditions that surround the mobile consumer interacting with a brand, and tailors their experience based on these conditions to enhance monetization efforts. The first step for brands to utilize the power of DIP is to add DIP's plug and play code into all existing traditional marketing efforts. Mobile or web embed code should be placed at the top of a web page just above the </head>tag. The embed code must be functional to: (i) create, read and update an existing cookie, session variable or value, or other readable and/or identifiable data structure on a client device upon browser interaction with a touchpoint; (ii) if no existing relevant data structure exists on the customer device, then set and establish a new data structure with a uniquely assigned identifier (user id); (iii) upon page visit and successful cookie read/placement, connect to server database and report/page visits including User ID, device time, device location (if allowed), device and internet protocol (IP) address of the visiting device; (iv) redirect user to an alternate page for selected scenarios; and (v) dynamically create a DIV overlay for ad or content placement on existing page being visited for selected scenarios (such DIV may include a picture, video text, or a short form that will send to an email address).

When creating embed code, administrators can select various parameters including: (i) 'ask for location' (a Boolean variable)—if selected, embed code will ask user input or query device for current device and customer location; and (ii) 'location frequency' (a numeric variable)—this sets how often to obtain location information, such as: always, every hour, every day, etc.

This embedding starts the flow of consumer data into the second part of the DIP platform, sometimes referred to herein as the REACTIVE ANALYTICS engine. In operation, detailed information that is gathered from the multitude of anonymous user sessions generated from one or more touchpoints are electronically stored and transmitted to DIP's REACTIVE ANALYTICS engine, which works in real-time to deliver a tailored consumer experience based on scenarios that have been created by administrators for a marketing campaign or the like.

DIP's scenarios are designed to change the consumer experience, creating the most simple path to monetization. In the simple scenario builder provided by the DIP platform and displayed to administrators via a user interface (UI), brands can treat mobile consumers differently based on their local weather, past participation, local inventory, day, time and date and other conditions as herein described. The real-time REACTIVE ANALYTICS engine makes all of a brands traditional marketing smarter. REACTIVE ANALYTICS works with URLs provided via e-mail, links on search engines or requests provided to search engines (e.g., GOOGLE, YAHOO), profiles on social media sites (i.e., TWITTER or FACEBOOK), hardlink codes or other indicia placed on product packaging (which may be scanned or imaged by customer devices), print ads or URLs placed in print media such as magazines or newspapers, any audio, visual, or audiovisual media (e.g., television, radio, YOUTUBE), print collateral such as direct mailings or marketing brochures, mobile advertisements on mobile websites (such as are presented to browsers of mobile communication devices), storefronts, billboards, and the like. In this manner, and according to the teachings of the present disclosure, traditional print and digital campaigns can come together to reward consumers and campaign administrators in real-time. The DIP platform preferably provides an extremely easy to use interface that allows those with no technical background to create complex scenarios, which control the destination of a user based on any number of variables.

In accordance with the foregoing, a computing device may receive a hardlink code in response to a search request entered by a user into a search engine, such as GOOGLE. In various such embodiments, the hardlink code may comprise one or more hyperlinks, such as are typically presented with a plurality of search results in response to a web-based search request. Using the computing device, the user may select one or more hyperlinks and be re-directed to a merchant website in the manners previously described. In additional embodiments, the hardlink code may be a hyperlink presented in a message, such as an electronic mail message or a cellular text message, or on a web page presented by a web browser on a display of the computing device. In various embodiments, the hyperlink code comprises a hyperlink presented on the device. In various embodiments, one or more of the hyperlinks that are so presented may be selected based on the geographic location of the user, the time at the geographic location of the user and the weather condition at the geographic location of the user. It is further contemplated that search results comprising the hyperlinks as presented on the computing device may be selected in part based on the search request entered by the user as well as the geographic location of the user, the time at the geographic location of the user and the weather condition at the geographic location of the user. In such embodiments, the ranking of search results may be altered based on the geographic location of the user, the time at the geographic location of the user and the weather condition at the geographic location of the user. For example, given a set of search results A, B and C, a standard search request may result in the search results being presented in the ranked order A, B, and then C according to their relevance to the search request. In the embodiments described immediately above, the ranking of the search results may be altered, for example, to be presented as A, C and then B, based on a higher relevance given to C over B given the relevance of the geographic location of the user, the time at the geographic location of the user and the weather condition at the geographic location of the user.

One example of a complex scenario established by an administrator is as follows. For all sessions initiated by a customer device interacting with a touchpoint, if (i) Customer Location=New York City, (ii) Time at Customer Location=6 AM to 9 AM, (iii) Current Date=September 1 to September 15, (iv) Number of Visits by Customer (per cookie data) >3; (v) Average Length of Previous Customer Visit >1 minute; (vi) Current Temperature=70 to 80° F., and (vii) Touchpoint Used to Initiate Session=scanned QR code;

then provide a designated offer stored in electronic memory to the customer device during the current session.

An example of a simpler scenario established by an administrator is as follows. This administrator runs a campaign in the month of January for one dollar off a cup of a hot or cold drink upon the first scan of a hardlink code, such as a QR code, depending on the temperature at the location of the customer. Upon additional scans, a second offer is presented to a customer. This campaign thus provides a different experience for consumers based on the real world conditions surrounding them, as well as their past interactions with the administrator's brand or company. According to such a scenario, a consumer in New York City, where it is 35° F., scans the QR code for the first time is driven to a coupon for one dollar off a hot coffee. A different consumer in San Diego scans the same QR code displayed in his location for the first time, where it is 85° F., and is driven to a coupon for one dollar off an iced coffee. A third consumer is scanning the QR code for the second time and is instead driven to a coupon for fifty cents off a breakfast sandwich, in order to try and encourage additional sales.

Using DIP technology, not only will vendors/marketers/companies/administrators be able to learn about how a user interacts with one brand or product, they will also have the ability to cross pollinate results based on usage throughout all brands and products for which scenarios and triggers have been established. Retailers who manage multiple brands can advantageously manage multiple brands under a single campaign managed with the DIP platform. However, should privacy laws not allow them to take advantage of cross pollination among different brands, they can instead create scenarios and run reports based on each individual brand and later combine the overall results.

Figure 13:
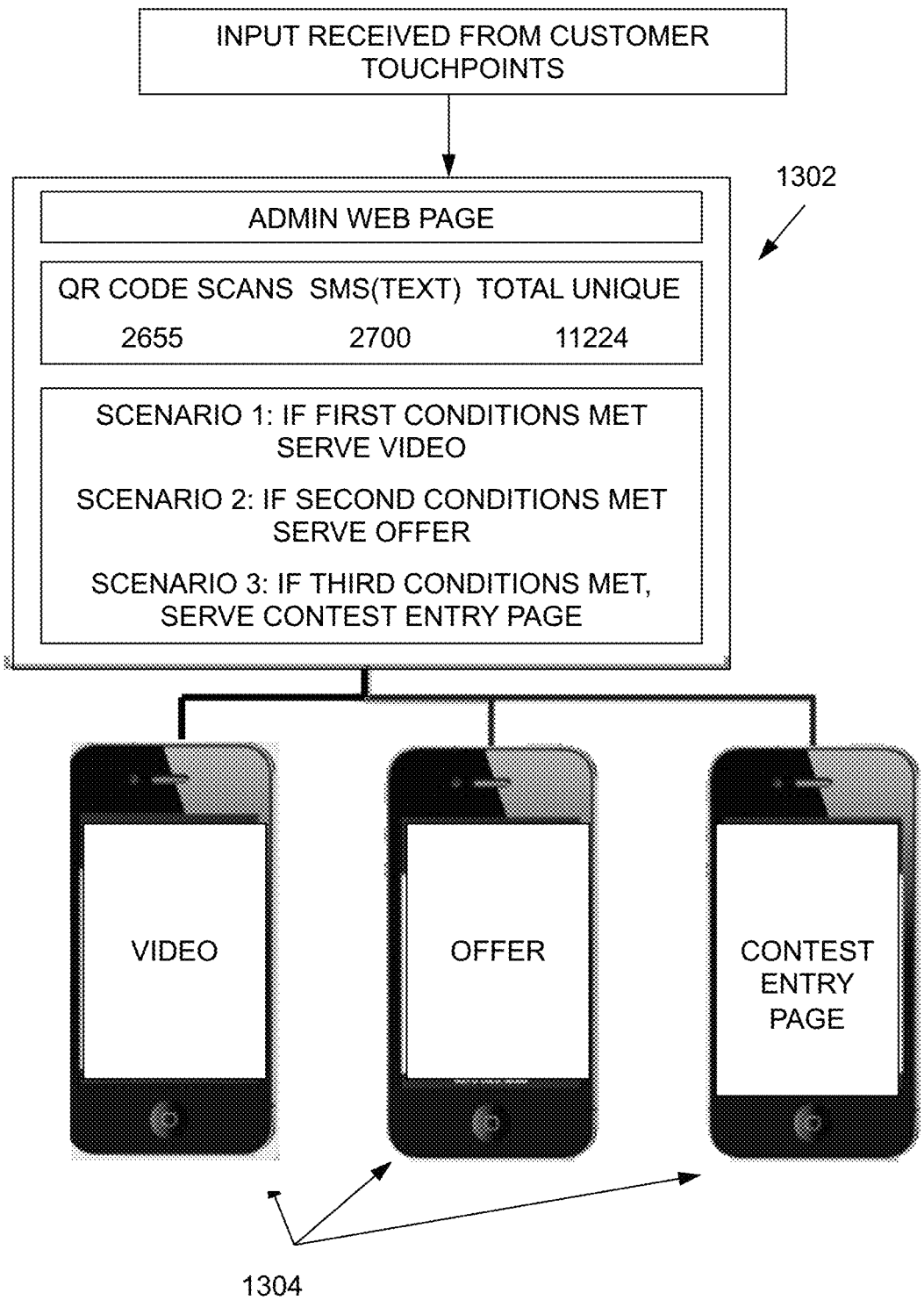
FIG. 13 is a representation of a process for performing dynamic intelligent profiling with content and destination selection based on real-world conditions according to the present disclosure.

Turning to FIG. 13, therein is depicted a representation of a process for performing dynamic intelligent profiling with content and destination selection based on real-world conditions. As shown therein, various customer devices 1304, such as smartphones, interact with a touchpoint established by an administrator. Given the touchpoints described herein, such exemplary customer or consumer interactions may include: a scan of a hardlink or QR code by the customer's device, a selection of any type of URL on a website or in an e-mail or SMS message, a snapshot or photograph or similar capture of product packaging or print media or store display or billboard or other print media by the customer's device, a visit to a social media profile or site using a browser of the customer's device, an entry of a search into a search engine visited/accessed by the customer's device, a capture of audio/visual/audiovisual information captured by a microphone, camera, or browser of the customer's device, and other similar such interactions with described touchpoints.

The administrator sets up various scenarios via an administrator interface 1302 to the DIP platform. Depending on which scenario is satisfied by a particular customer, different destinations or content may be provided to the customer devices 1304. Such exemplary scenarios may be as follows:

Scenario 1: If the consumer has visited multiple times in the last 15 days; and is located in New York; and interacted with the touchpoint via direct mail or a social media site; then serve such customer an exclusive video page.

Scenario 2: If the temperature is above 85°; and it is between 7 AM and 11 AM; and the consumer is located in California; then serve an offer for $1.00 off a 16 oz iced coffee.

Scenario 3: If the consumer is located in NY, NJ, CT, PA or MA; entered the touchpoint via a scan of a QR code on product packaging; and the date range is between April 1 and July 1; then serve a page where the customer may complete a contest entry form via their device 1304.

DIP thus gives non-technical users the ability to create complex scenarios using a simple logic-based scenario builder. These scenarios will lead to higher monetization through a more tailored user experience based on the real-time customer interaction data that is anonymously gathered and stored by DIP. DIP's REACTIVE ANALYTICS make mobile and traditional websites smarter. Simply pasting the plug and play code below current analytics coding allows administrators to readily alter the offers and ads seen by visitors to your brands mobile website. Now, you can encourage new and additional consumer interactions with your brand that will provide an enhanced consumer experience, leading to higher brand loyalty and mobile monetization. DIP works with existing mobilize-enabled websites in particular and changes consumer experience with a touchpoint based on surrounding real-world conditions (GPS/Location, weather, date, time) and past user behavior (e.g., number of previous customer visit to a touchpoint). This functionality is not only useful to administrators of marketing campaigns, but also creates a reason for a consumer to return to a touchpoint and interact multiple times, since it can provide new content to a consumer with every new interaction or session.

The final component of the DIP platform contemplates use of INTELLIGENT PACKAGING and interactive marketing collateral to enhance customer experience with a brand or product. INTELLIGENT PACKAGING takes advantage of generally unused potential marketing real estate, namely the packaging of a real-world product. By establishing the product packaging as an interactive touchpoint for consumers (such as by scanning the static product packaging with a customer's computer or mobile communications device) encouraging multiple interactions between a customer and a brand. It also allows brands to provide up-to-date and dynamic promotions, advertising and video without the need to reprint product packaging for each campaign. Thus, brands can encourage new and additional consumer interactions that will provide an enhanced consumer experience, leading to higher brand loyalty and monetization. Customer experiences with interactions with product packaging can change based on surrounding real-world conditions and past user behavior such as GPS/Location, weather, day, time, local inventory of a product, and number of past interactions or visits by a customer.

Similar to INTELLIGENT PACKAGING, Interactive Collateral can make static print media come alive in the same manner. Marketers can turn an otherwise static marketing piece into an engaging branding opportunity with differing experiences to customers. Now, marketers can encourage new and additional consumer interactions with their brand that will provide an enhanced consumer experience, leading to higher brand loyalty and mobile monetization. Interactive collateral thus gives static print media a dynamic voice, and changes the consumer experience based on surrounding real-world conditions and past user behavior, such as GPS/location, weather, date, time, local inventory and number of past customer visits. Interactive collateral serves customized content to consumers, maximizing return on investment potential and encouraging multiple, repeat customer interactions. It also eliminates reprinting costs by allowing brands to dynamically change promotions being offered without reprinting the print media. In this manner, DIP bridges the gap between the physical and the digital world in manners that have heretofore not been contemplated.

Recapping the foregoing discussions, DIP implementation can be accomplished by embedding DIP plug and play code. DIP allows brands to create mobile, web or real-world touchpoints, and provides a simple interface for the creations of scenarios and triggers. DIP conglomerates and reports on all marketing touchpoints that have been established and stores session-based anonymous user data for subsequent use and analysis. DIP records real-time, real-world conditions surrounding the consumer at the time of interaction, adjusts the content based on scenarios to increase chances of monetizing consumer engagement, with no significant delay in bringing offers, promotions and content to market.

Figure 14:
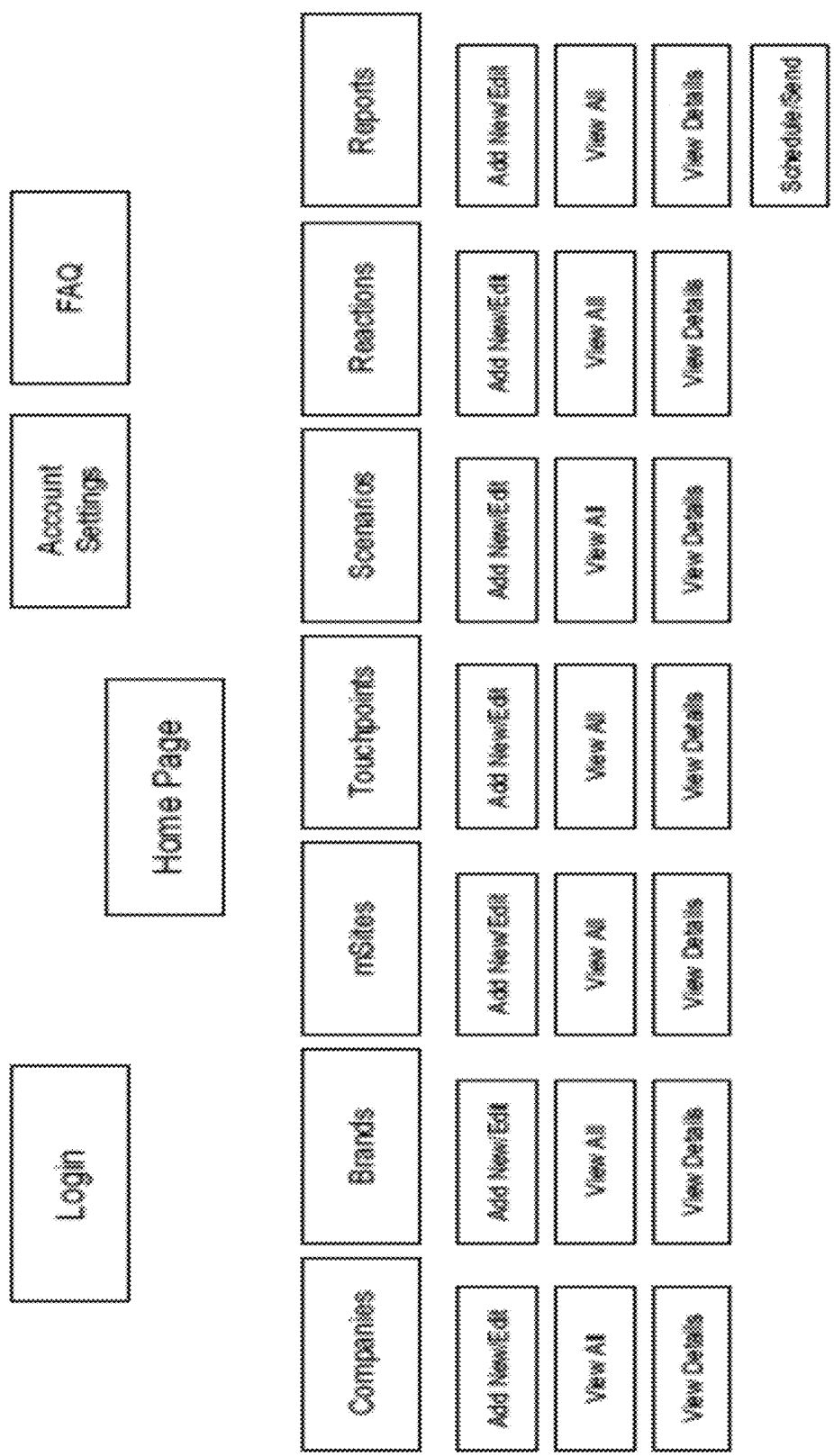
FIG. 14 is a block diagram of exemplary functions presented on a computer display for establishing scenarios for use with dynamic intelligent profiling according to the present disclosure.

Turning now to FIG. 14, therein is depicted a block diagram of an exemplary hierarchy of functions presented to an administrator on a computer display for establishing scenarios for use with DIP. The DIP platform will have a hierarchy of functions similar to the environment in which it is meant to be used. Each block in FIG. 14 represents a selectable function or sub-function available to the administrator. As depicted therein with component blocks representing functions provided via the DIP platform interface, an exemplary hierarchy of such functions may be as follows:

Companies->Brands->mSites->Campaigns->Touchpoints

Company: This is the company account or accounts represented by an administrator.

Brand: A company can have multiple brands and each brand can have established 'states,' such as Active or Inactive.

mSites: is the mobile site of a brand. Brands can have multiple mSites. mSites may be classified as either a Main, Micro, or Landing Pages. Although they're not dependent on each other, these classifications are simply for distinction and reporting/scenario options. mSites can have defined states, such as Live or Offline.

Campaigns: Campaigns are assigned to one or more Brands, and are an organizational tool within which multiple touchpoints can be placed. For example, a company undertaking a print campaign can also have any number of accompanying QR codes, SMS, URL or other print and non-print touchpoints within the campaign. Touchpoints do not have to be associated with a campaign since it's optional to the administrator, however, campaigns can have defined 'states', such as Active or Archived.

Touchpoints: touchpoints preferably belong to a single brand, and if desired, a single campaign. They do not need to be contained within a campaign. Touchpoints can have administrator defined states, such as Active or Archived.

Reactions and Reports: accesses stored data on customer reactions received regarding DIP-implemented campaigns, and generates reports requested by the administrator of a campaign. The reports may be generated on demand or at specified intervals and may contain any analytical information that has been captured by DIP.

The hierarchy above assumes the Administrator is at the highest user level, to which all DIP functionality and settings are available. Lower level users may be provided with access to the DIP platform for a campaign and may have limited functionality or otherwise have some functionality removed at the discretion of the administrator.

Figure 15:
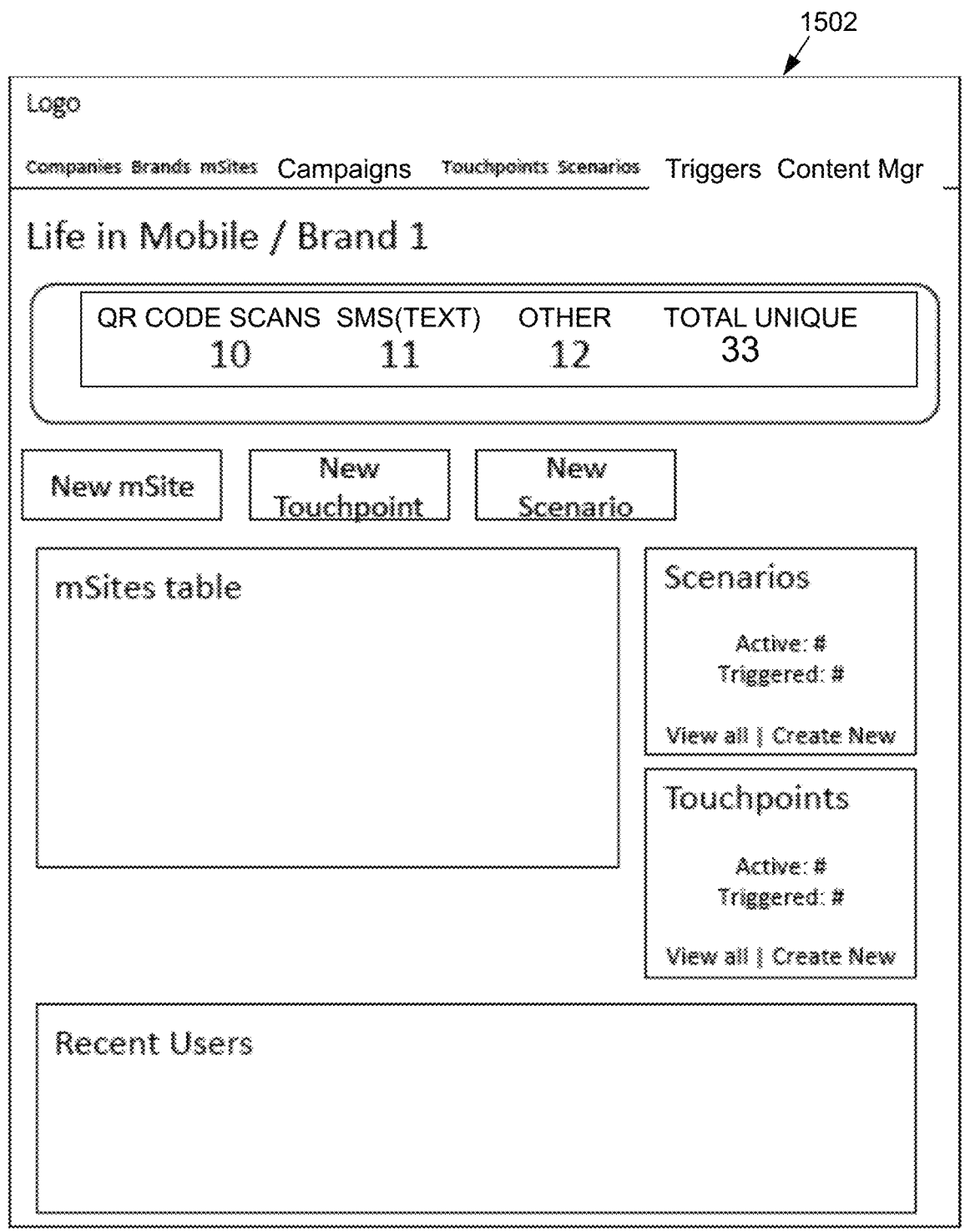
FIG. 15 is an exemplary screen display presented to an administrator for managing the dynamic intelligent profiling processes according to the present disclosure.

Turning now to FIG. 15, therein is depicted an exemplary user interface 1502 presented to an administrator for example on a computer display for managing the dynamic intelligent profiling processes described herein and viewing the results of DIP implementation, according to the exemplary hierarchy of FIG. 14. This interface 1502 may be provided on a web page accessible to the administrator. The exemplary interface 1502 may be a more detailed version of the administrator interface 1302 of FIG. 13.

The following menu options may be available to an administrator on a menu bar or the like on the administrator interface 1502 via the DIP platform:

Home|Companies|Brands|mSites|Campaigns|Touchpoints|Scenarios|Triggers|Content Manager|Reports|Help/Frequently Asked Questions (FAQ).

Various of these available exemplary functions are more fully-defined immediately below:

Home: selection of this function may bring the administrator or other user to a front page of the DIP platform for their campaign. Options under the Home function may include: Full site navigation/current visitor statistics/brand list and statistics/mSite list and statistics/Visitor overview (all brands);

Brands: Selecting this function allows an administrator to create new or editing existing brand campaigns maintained by DIP. Options under the Brands function may include: Current visitor statistics for a brand/Current statistics for all brands/campaigns/Brand name/Visitor data/mSites statistics/rename brand/archive data/reports generation;

mSites: Selecting this functions allows an administrator to create or assign new touchpoints for a campaign or to view statistics on existing touchpoints. Options under the mSites function may include: Current visitor statistics/List of all mSites and statistics/mSite type/date created/rename/archive/install DIP embed code/create-edit reports/create-edit scenario;

Campaigns: Selecting this function allows an administrator to create new or edit existing campaigns stored by the DIP platform. Options under the Campaigns function may include: Current visitor statistics/List of all campaigns and statistics/date created/Campaign name/Brand name/Touchpoints/Visitor statistics/rename/archive/reports/create scenario/New Campaign/View archived Campaigns;

Touchpoints: Selecting this functions allows an administrator to create or assign new touchpoints for a campaign or to view statistics on existing touchpoints. Options under the Touchpoints function may include: Current visitor statistics/List of all Touchpoints and statistics/date created/touchpoint name/applicable brand(s)/date created/visitor statistics/rename/archive/reports/create;

Scenarios: This functions presents the administrator with a software-based logic builder for generating Scenarios, or conditions, for responding to a customer interaction with a touchpoint in a campaign. Options under the Scenario function may include: Create logic/simulate Scenario/effective date range/Scenario frequency 9 e.g., number of times active per hour, day, week, month, etc.)/save Scenario/view associated Triggers/rename scenario/archive scenario/establish recognizable URL/QR image for scenario/reports/create new Touchpoint(s)/view touchpoint archive/;

Triggers: This function allows an administrator to edit or create triggers, representing actions to be taken in response to a customer interaction with a touchpoint and/or the matching of a customer behavior or real-world variables with a scenario created by the administrator. Options available under the Triggers function may include: /Create new trigger/Edit existing trigger/save trigger/view all triggers/trigger type (e.g., redirection page, create ad region on existing page, launch of overlay advertisement, and/or web content to serve from stored content library and accessible by the Content Manager function);

Content Manager: This is the library for all content to be associated with triggers. Content types may include overlay units that may be presented on a deice display as a pop-up window in a browser and in-page units that are positioned on a web page being viewed on a device. Options available under the Content Manager may include: /Create new content (content building logic)/edit existing content/view all content/archive content/view archive/.

In various embodiments described herein, the plug-and-play software code for implementing the DIP platform may include JAVASCRIPT functionality. The DIP platform advantageously includes parameters that flag internal test hits to a campaign touchpoint, so that such interactions are not recorded as consumer statistics that are being monitored and stored. The DIP platform may include additional programmed functionality for monitoring, flagging and reporting anomalously high consumer traffic patterns based on comparisons to current and/or previous campaigns. Such anomalies may readily reflect a successful campaign. Other uses for anomalous traffic patterns will be readily apparent to one of ordinary skill in the art.

In all the foregoing embodiments, as well as in other practical uses, it may be desirable to dynamically re-direct web traffic received in response to a touchpoint to a plurality of dynamically determined network addresses, rather than to a single static address, as has been the overwhelming norm in existing network technologies and practices. Such dynamic re-direction of received web traffic may be routed to differing destinations under various programmed conditions. In various embodiments, the re-directions are to a website. In various embodiments, the re-directions may be to differing digital content destinations on the same destination server. In the latter case, such differing digital content may include, without limitation, an Application Program Interface (API) or database call or a call to separate web pages on the same web site. The digital content may include any of text, photo, audio, visual, and/or audio-visual data that may be presented to a re-directed user on the user device. In various embodiments, the variables used for conditions may be operating parameters of networked connected devices, sometimes referred to as the Internet of Things (IoT). In many of the foregoing embodiments, such condition variable may be a geographic location of a user interacting with a touchpoint, and a time of day and a weather condition at that geographic location. However, this functionality may be expanded to include any one or more of a wide variety of determinable conditions, such as a user device type, a radial distance from a geographic location, a future or forecasted weather condition, a historical weather condition, a past, present or future individual weather variable (i.e., temperature or humidity), an outcome of a pseudo-random number generator, a user's referral status, a returning user status, a frequency of touchpoint interaction by a user, a history of touchpoint interactions of a user, a social media activity of a user, a social media trending topic, and a keyword search entered into a search engine by a user. Indeed condition variables may include any available data variable(s) that are verifiable via electronic requests and receipt of relevant real-time data and information such as is readily available over the computer network. Exemplary data variables may include, without limitation, a product inventory level as may be electronically stored in a network-accessible database, a score of a sports game, a present value of a stock market ticker, and the like.

Figure 17:
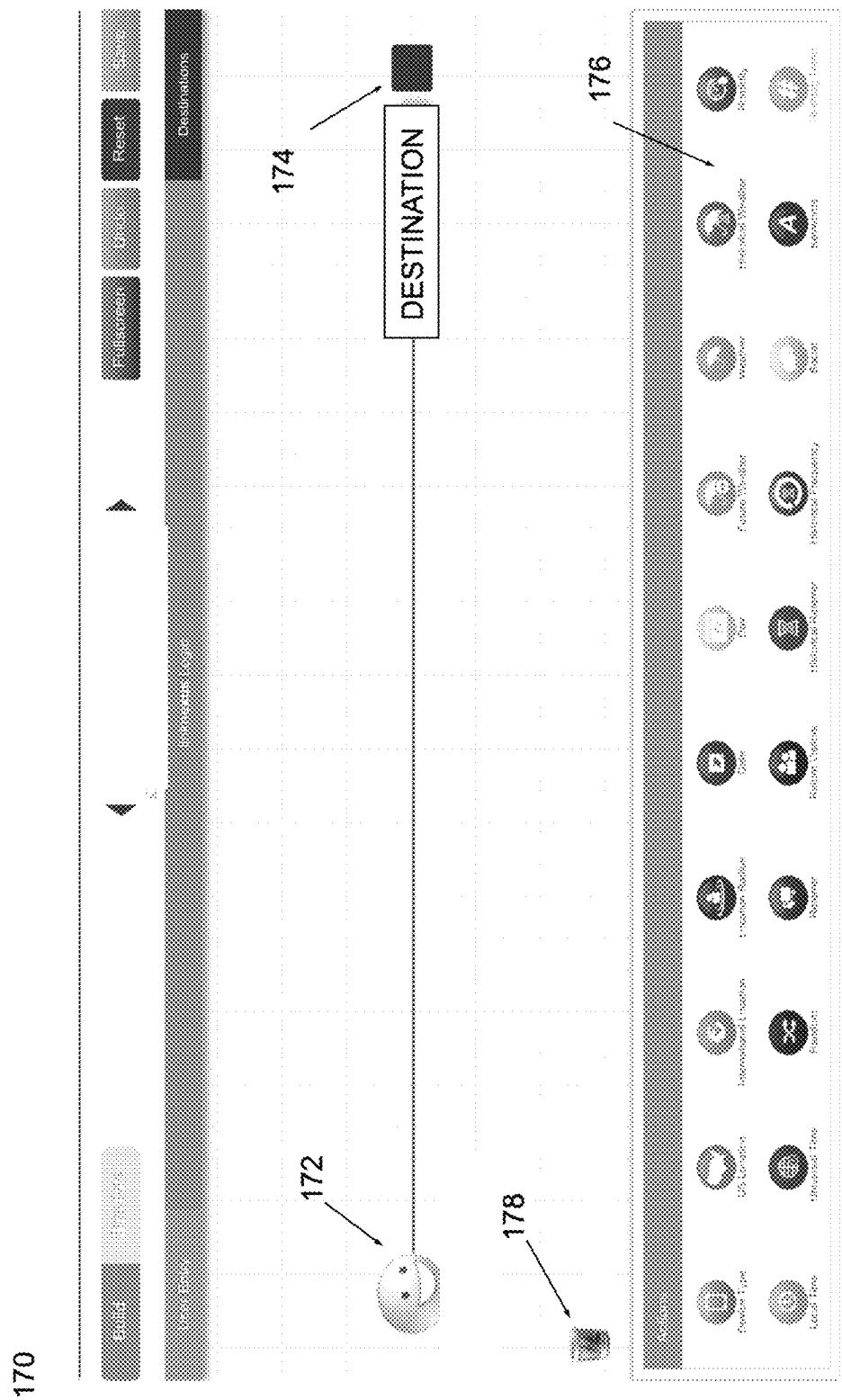
FIG. 17 is an exemplary screen display of a user interface presented to an administrator for establishing a conditionless re-direction destination according to the present disclosure.
Figure 18:
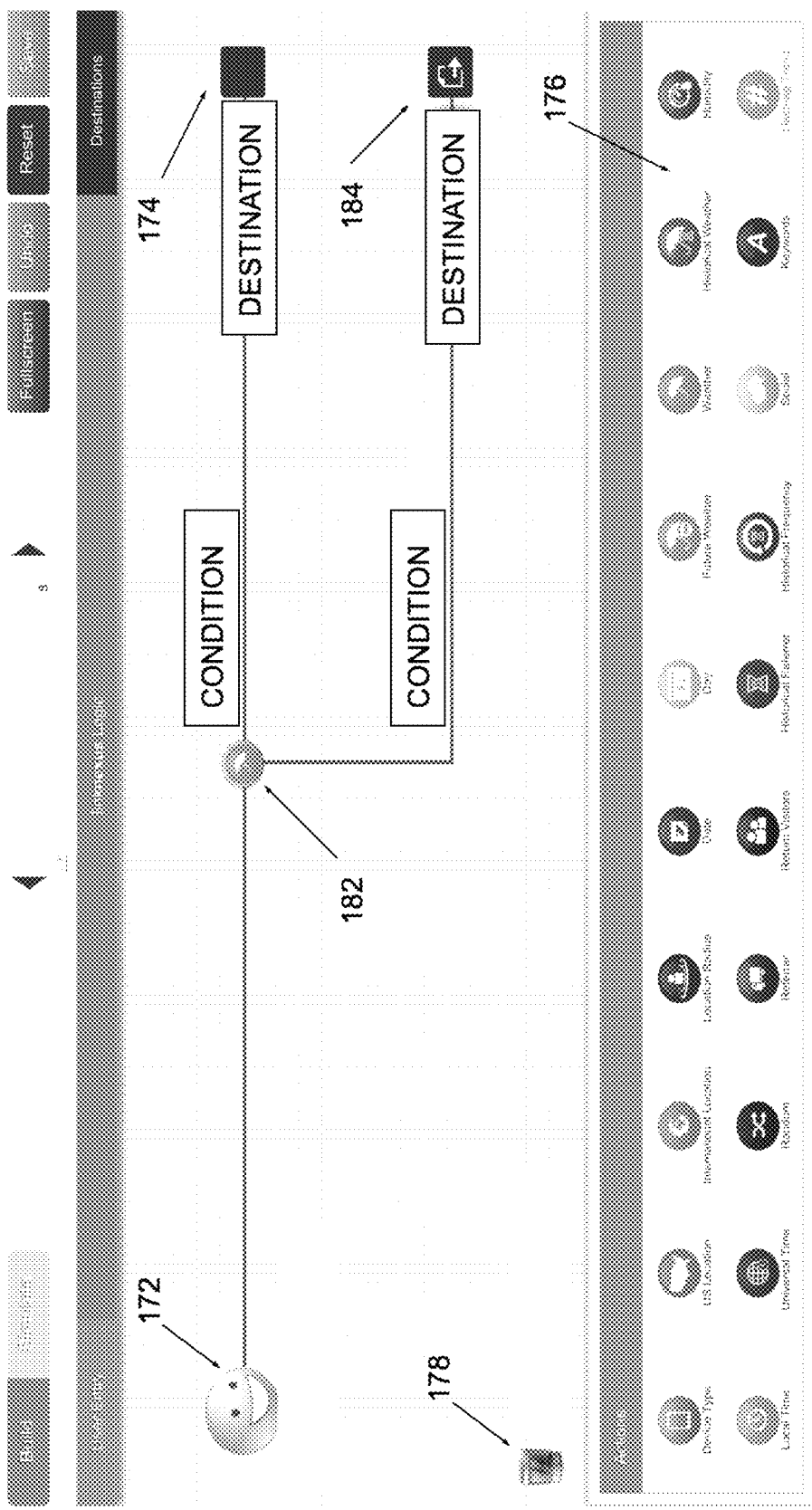
FIG. 18 is an exemplary screen display of a user interface presented to an administrator for establishing a conditional re-direction destination according to the present disclosure.
Figure 19:
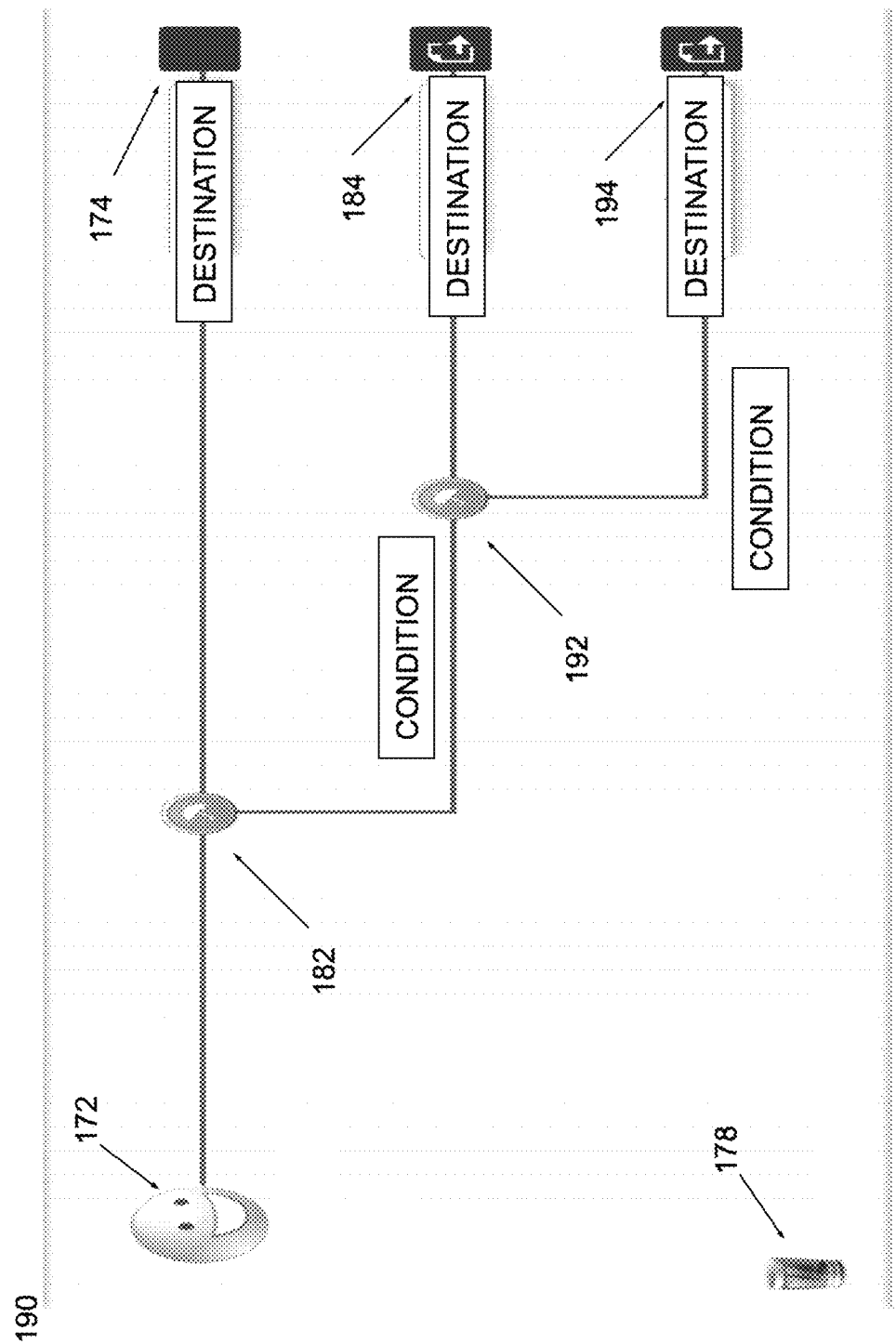
FIG. 19 is an exemplary screen display of a user interface presented to an administrator for establishing multiple conditional re-direction destinations according to the present disclosure.

In order to establish such programmed conditions, a graphical user interface may be generated and provided by the web server hosting this re-direction service, such as server system 22 above. The graphical user interface may be accessed, programmed and re-programmed by an administrator or other authorized via a remote computing device in communication with the web server over the computer network. The graphical user interface may sometimes be referenced herein as LINKNEXUS. Various embodiments of a suitable LINKNEXUS interface are depicted in FIGS. 17-19 below. However, many other possible and useful variations of the interface are readily contemplated by one of ordinary skill in the art. Accordingly, these depictions are meant to be exemplary and not limiting. Using the LINKNEXUS or other interface of similar functionality, the administrator or other user may program desired conditions by which all or selected web traffic (such as resulting from users interacting with touchpoints) will be automatically and continuously be redirected from one network destination to an alternate network destination or destinations, based on the satisfaction (or not) of one or more established conditions. For example, a programmed condition may be of the form: IF <user's weather condition>='RAINY' THEN set network destination='http://<network destination 2 URL>', ELSE set network destination='http://<network destination 1 URL>'. Multiple conditions and sub-conditions may be set as described further herein. Multiple alternate network destinations may likewise be programmed and alternated for each condition. The conditions themselves may also be dynamic and not static, and based on any number of the described variables herein and contemplated equivalents. Programmed conditions and destinations can be tested and simulated prior to actual implementation, and, if necessary, re-accessed and re-programmed by the administrator or other user. The potential outcome of real or simulated network traffic may be monitored during simulation. Once all conditions are finalized, the re-direction server will re-direct incoming or received web traffic to the programmed destinations, based on which programmed conditions are satisfied.

Figure 16:
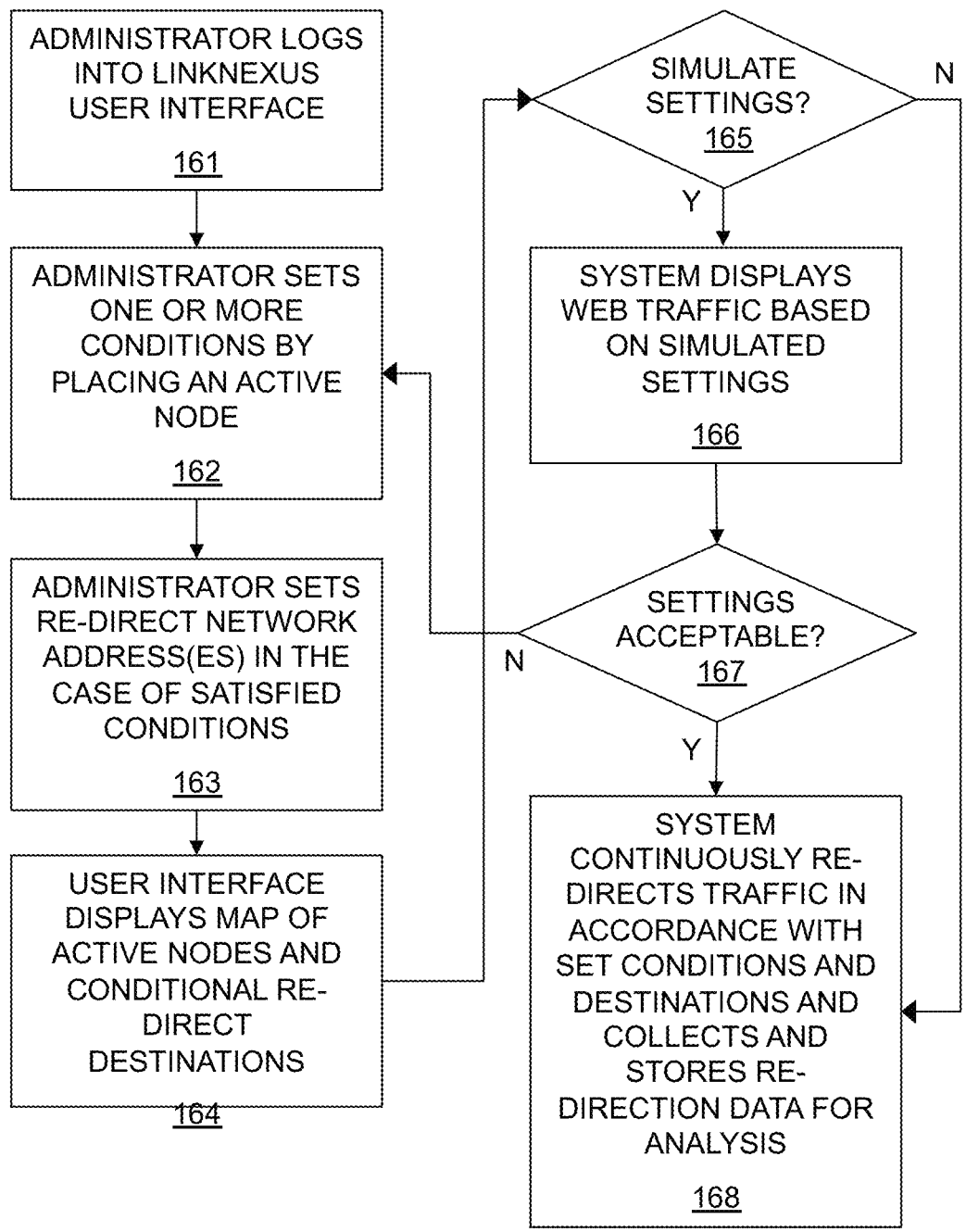
FIG. 16 is an exemplary process, performed by a web server, for presenting a user interface for establishing conditional re-direction destinations according to the present disclosure.

FIG. 16 is an exemplary re-direction programming process 160, performed by a re-direction server, by which programmed or re-programmed conditional re-direction destinations are established according to the present disclosure. The process 160 commences at step 161 when an administrator or other authorized user logs into the re-direction web server hosting the user interface from a remote computing device. The login may be via entry of an authorized login identifier and associated password, the entry of security question, or biometric scan, such as thumbprint verification, or by any other conventional manner of server login. Responsive to a valid login, the redirection server presents a graphical user interface for setting conditions and re-direction destinations.

Next, at step 162, a first condition is established by the receipt of inputs from the remote access device corresponding to the user's selection of an active node for placement on the graphical user interface. The active node may be a visual icon or the like representing a first programmed condition, such as presented in and described below with respect to FIGS. 17-19. The programmed condition may be a variable that can be queried and verified by the re-direction server over the computer network without human intervention. The programmed condition may initially be entered in a human recognizable language and subsequently converted to a useful computer processing language by any of a variety of conventional natural language translators. A set of pre-programmed condition types may be provided and selectable from the graphical user interface. The administrator may also create custom conditions via further specialized programming. A textual representation of the condition may be presented on the graphical user interface in proximity with its corresponding active node. Alternatively or in addition thereto, the textual representation for the programmed condition may likewise be viewed by selecting or hovering over the visual icon using a user input device.

Next, at step 163, the administrator programs the desired network address or addresses to which web traffic will be re-directed when a corresponding condition is satisfied. The network address may be a desired URL or other known network destination type of similar functionality. So, for example, a programmed condition established using an active node may establish that upon satisfaction of a condition (as automatically verified with network-accessible data), incoming web traffic (such as may be received from user device interaction with touchpoints as previously described) may be re-directed to a desired network address, such as a first URL. What necessarily follows is that if the condition is not satisfied, then the web traffic will be re-directed to a different network address, such as a second URL or the like established by the administrator via the graphical user interface. Alternatively, when the condition is not satisfied, web traffic may no be re-directed at all from the re-direction server and desired content may be presented instead. In further alternate embodiments, the second URL may be an established default URL or default web content for all re-directions in the absence of an established programmed condition.

Next, at step 164, the graphical user interface (such as graphical user interface 170) displays a visual representation of active nodes and network destinations as established by the administrator, non-limiting examples of which are shown in FIGS. 17-19. The administrator may thus visual inspect the programmed conditions and resulting network address destinations that have been established, preferably in a suitably intuitive manner. This may allow the administrator to visually verify that the programmed conditions will yield the desired re-direction results.

Next, at step 165, the graphical user interface may allow the administrator to simulate the programmed conditions and re-directions, if desired. If the administrator does not wish to simulate, the process 160 continues to step 168 below. Otherwise, the process 160 continues to step 166, where the graphical user interface provides simulated conditional re-direction outcomes of web traffic based on current programmed conditions and re-direction network address. This information may be displayed, for example via the interface 150 of FIG. 15 above, or other useful equivalent. The simulation mode, when activated, may use real time-network traffic (that is not actually re-directed in the simulation phase) or instead may use simulated web traffic that is generated randomly or according to programmed parameters by the re-direct server itself.

Next, at step 167, the graphical user interface requests whether the settings are acceptable based on the simulated web traffic. If the administrator indicates affirmatively, the process 160 continues to step 168 below. Otherwise, the process returns to step 162 above, where programmed conditions and destinations can be re-programmed.

Finally, at step 168, once the above programmed conditional re-directions are accepted by the administrator, the re-direct server automatically and continuously re-directs web traffic in accordance therewith. Re-direction data may continuously be collected and stored by the web server in conventional databases or the like. For example, the number of interactions between users (which may include hundreds, thousands or more simultaneous users at any given time) and web sites at the re-direction addresses under a given condition may be monitored and tracked, preferably in an anonymous fashion with respect to each user's identity. This may include determining the total number of sales that may have occurred after a re-direction of a user to a merchant web site under one or more conditions. Trends in the resulting data may be used to optimize future re-directions, in order to, for example, drive or increase sales at a merchant site, increasing the number of returning users to a website, or other useful resulting analytical data that may likewise be used without limitation.

FIG. 17 is an exemplary screen display of the graphical user interface 170 presented to an administrator for establishing conditional re-directions of web traffic as described herein. In this instance, a condition-less, static re-direction to a network address destination is depicted. The graphical user interface 170 may include an entry point icon 172, representing the initial computer network address to which incoming web traffic (such as resulting from a user interaction with a touchpoint) is received. As such, it may be a visual representation of the re-direct server running the graphical user interface 170.

The graphical user interface 170 may further include a destination icon 174 representing a network address destination (i.e., a URL, IP address or other useful type of network address) to which the incoming web traffic is to be re-directed.

The graphical user interface 170 may further include one or more programmed condition icons 176, each representing programmed conditions that may activated by the administrator by selection and placement within the graphical user interface 170. Such programmed conditions may relate to variables such as: the geographic location of a user, the time of day at that geographic location, a weather condition at that location, user device type, a radial distance from a geographic location, a future or forecasted weather condition, a historical weather condition, a past, present or future individual weather variable (i.e., temperature or humidity), an outcome of a pseudo-random number generator, a user's referral status, a returning user status, a frequency of touchpoint interaction by a user, a history of touchpoint interactions of a user, a social media activity of a user, a social media trending topic, and a keyword search entered into a search engine by a user. This will be described further with respect to FIGS. 18-19. In this instance, however, no conditions for re-directing web traffic have yet been established. Accordingly, this set-up represents conventional static re-directions of web traffic from one web site to another website or network destination.

The graphical user interface 170 may further include a toggle button 178 for toggling textual representations of programmed conditions and network address destinations on the display of the graphical user interface 170. Accordingly, upon a selection of the toggle button 178, text describing the programmed condition may be presented near any active node placed on the graphical user interface 170 and text identifying the destination network address may appear near the destination icon 174. Upon de-selection of the toggle button 178, the text descriptions of the programmed conditions and destination network addresses may be removed from the graphical user interface 170.

FIG. 18 depicts the graphical user interface 170 in which an active node icon 182 representing a single condition for establishing re-direction to a second destination network address is programmed by the administrator. In various embodiments, the administrator may have selected the active node icon 182 from one of the available programmed condition icons 176. Upon selection and placement of an exemplary weather condition icon from the programmed condition icons 172, the administrator may place the weather condition icon as the active node icon 182. The administrator may then program the weather condition to be a temperature condition at the geographic location of the user originating the incoming web traffic, for example, temperature greater than or equal to 70 degrees Fahrenheit.' The administrator may then program the destination icon 174 to a first network address, where web traffic will be directed when the programmed condition of the active node 182 is not met. The administrator may then set a second destination icon 184 to a second network address, where web traffic will be directed when the programmed condition of the active node 182 is met. The programmed condition and destination addresses may be toggled on and off with the toggle button 178.

Any number of additional active nodes and destinations may then be added and edited, as desired. Accordingly, FIG. 19 depicts an exemplary screen display of the graphical user interface 170 as presented to an administrator in which multiple conditions and re-direction destinations have been established. In particular, a second active node icon 192 representing a second programmed condition, and a third destination icon 194 representing a third network address have been placed by an administrator on the graphical user interface 170. Accordingly, when the condition represented by active node 183 is not met, all incoming web traffic will be directed to the destination programmed for destination icon 174. When the condition represented by active node icon 182 has been met, but the condition represented by second active node icon 192 has not been met, then all incoming web traffic will be re-directed to the second network address programmed for the second destination icon 184. Finally, when the condition represented by active node icon 182 has been met, and the condition represented by second active node icon 192 has also been met, then all incoming web traffic will be re-directed to the third network address programmed for the third destination icon 194. Additional active nodes may also be placed with each active node corresponding to a new network destination in similar manners.

The graphical user interface 170 may include further icons representing functions that are available. For example, a simulate button may be provided to allow the administrator to simulate programmed conditions against real or simulated web traffic. A save button may be provided for saving and running the programmed conditions. An edit button may be provided for allowing the user to edit the active nodes and destinations established in the graphical user interface 170. A trash button may be provided to delete one or more of the active nodes displayed on the graphical user interface 170.

FIG. 20 depicts exemplary programming for setting a new conditional re-direction destination, for example, the new active node 182, in accordance with the foregoing.

FIG. 21 depicts exemplary programming for setting one or more supplementary conditional re-direction destinations, for example, the second active node 192, in accordance with the foregoing.

In various embodiments, the LINKNEXUS graphical user interface may be used to operate devices based on programmed conditions. For example, with the evolving technology represented referred to as the Internet of Things, various consumer appliances and systems may be connected and controlled via computer networks. Such networked-controlled systems include lighting, environmental controls, security systems, door locks, garage door openers, and the like. Network controlled consumer appliances may include refrigerators, dishwashing machines, clothes washing machines, clothes dryers, televisions, entertainment systems and the like. Network destinations as described in the foregoing may consequently include sending programming instructions to IoT devices, so instead of redirecting to a network destination, an IOT server receives the instructions and operates one or many devices based on conditions programmed via the graphical user interface 170.

As described in the foregoing, LINKNEXUS is a post-click engagement tool, allowing consumers to be directed to relevant content based on variables unique to them including time of day, day of week, weather conditions, referring sites, and other conditions as described in the foregoing. LINK-NEXUS may also be used to determine how ads are served, thereby opening up an entirely new purchase opportunity for advertisers.

Traditionally digital ads have been purchased and served to target audiences based on content sites and volume alone. LINKNEXUS opens up an entirely new way to purchase ads, which is site and/or content agnostic but provides a real-world targeting toolset, referred to as Environmental Purchasing Rules or EPRs. Now advertisers can create EPRs and purchase and/or bid on unique combinations of variables unique to consumers. For example, advertisers can purchase ads:

on Tuesdays between LOAM and 1 PM local time when the weather is sunny on weekdays if a consumer is within 50 miles of any restaurant location if a consumer is in NY or NJ when its raining and the humidity is over 80% on Sundays after 5 PM if the consumer came from Google or Yahoo and is on a Mobile device Ii a consumer came from FACEBOOK, is on a PC or tablet and the temperature is below 40 F; and many more combinations of desired programmed conditions.

LINKNEXUS functionality offers advertisers two ad-placement opportunities:

1) Interstitial: After a consumer clicks a link, but before that consumer lands on the destination page (which is determined based on owner-created scenarios, as described in the foregoing) the consumer can see an interstitial advertisement.

2) Modal/Popup: When arriving at the LINKNEXUS-programmed destination page, if conditions are met a modal/popup ad can be served to the end user.

Publishers can simply access the LINKNEXUS site or add LINKNEXUS embed code to their site by pasting it in (similar to any Analytics code) or for WORDPRESS users, installing the WORDPRESS plugin. Not only will the publisher get deep insights into their web traffic and have the ability to dynamically determine destination based on real-world variables of the end user, but will also be able to set monetization options for both generated links, and LINK-NEXUS-powered websites. Each publisher using LINK-NEXUS is provided with a simple dashboard, such as the graphical user interface 170, allowing them to adjust monetization options including volume of ads placed, types of ads to show or not show, frequency of ads per user and much more.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A computer system for dynamically and conditionally presenting content using an interface, comprising:
   a computing device that includes a processor and an electronic memory, wherein the electronic memory includes stored therein:
   a plurality of content of a merchant that may be selected and presented on a video display screen; and
   a plurality conditions for selecting one or more of the plurality of content, wherein the conditions are based on at least one weather condition, which is determined for at least one customer;
   wherein the computing device further includes instructions stored therein for execution by the processor to:
      receive an indication of a customer location based on a customer interaction with a touchpoint;
      in response to the indication, determine a current geographic location of the customer and a weather condition at the geographic location of the customer;
      select, based on the weather condition at the geographic location of the customer and the conditions, one or more of the plurality of content of the merchant; and
      transmit for presenting, on the video display screen, the selected content of the merchant to the customer.

2. The computer system of claim 1 wherein the touchpoint is a mobile touchpoint.

3. The computer system of claim 1 wherein the touchpoint is webpage.

4. The computer system of claim 1 wherein the touchpoint is indicated by a URL.

5. The computer system of claim 1 wherein the touchpoint is a merchant kiosk.

6. The computer system of claim 1 wherein the plurality of conditions include conditions based on increased demand for a product or service during certain of the at least one weather conditions.

7. The computer system of claim 6 wherein certain of the plurality of the content is selected and transmitted for presenting to the customer based on increased demand for a product or service during certain of the at least one weather conditions.

8. The computer system of claim 1 wherein the video display screen is a video display screen of a wireless device.

9. The computer system of claim 1 wherein the computing device further includes instructions for processing a customer interaction with a merchant server and entering into a transaction for at least one of a good and a service.

10. The computer system of claim 1 wherein the memory includes stored therein one or more offers from merchants that are presented to a customer with selected content in response to the weather condition.

11. The computer system of claim 1 wherein the at least weather conditions include at least one of humidity, precipitation, and temperature.

12. The computer system of claim 1 wherein the customer interaction with the touchpoint includes an interaction through social media.

13. The computer system of claim 1 wherein the customer interaction with the touchpoint includes an interaction through a website.

14. The computer system of claim 1 wherein the customer interaction with the touchpoint includes an interaction through a mobile device.

15. The computer system of claim 1 wherein the plurality of content includes at least one of text, photo, audio, visual, and audio-visual data.

16. The computer system of claim 1 wherein the plurality of content includes at least one of advertisements, offers, or promotions.

17. The computer system of claim 1 wherein the computing device further includes instructions stored therein for execution by the processor to adjust the selected content based on scenarios to increase chances of monetizing a consumer engagement.

18. The computer system of claim 1 wherein the memory further includes stored therein demographic data, contact information, biographical data, and marketing preferences of one or more customers and the computing device further includes instructions stored therein for execution by the processor to determine the demographic data, contact information, biographical data, and marketing preferences of the customer.

19. The computer system of claim 18 wherein the plurality of conditions include conditions based on the demographic data, contact information, biographical data, and marketing preferences of the customer.

20. The computer system of claim 1 wherein the plurality of conditions include conditions based on the time of day at the geographic location of the customer and selecting of one or more of the plurality of content of the merchant also selects the one or more content based on the time of day at the geographic location of the customer.

21. The computer system of claim 1, wherein the one or more weather conditions include at least one of a past weather condition, a current weather condition and a future weather condition.

22. A method performed by a computer server system in communication with remote computing devices over a communication network, comprising:
   establishing a graphical user interface on the communication network;
   storing a plurality of separate content for selective transmission to devices;
   storing a rule for selecting content from the plurality of separate content, the rule dependent on geographic locations, times at the geographic locations, and weather conditions at the geographic locations, which are determined in response to indications of interactions with touchpoints;
   receiving, from a first device, a first indication of a first interaction with a touchpoint;
   determining, in response to the first indication, first data including a geographic location of the first device, a time of the first indication, and a weather condition at the geographic location of the first device;
   selecting first content from the plurality of separate content based on the first data and the rule;
   re-directing the device to the first content;
   receiving, from a second device, a second indication of a second interaction with a second touchpoint;
   determining, in response to the second indication, second data that includes a geographic location of the second device, a time of the second indication, and a weather condition at the geographic location of the second device;
   selecting second content from the plurality of separate content based on the second data and the rule; and
   re-directing the second device to the second content.

23. A method performed by a computer system for dynamically and conditionally presenting content using an interface, comprising:

storing, in an electronic memory of a computing device, a plurality of content of a merchant that may be selected and presented to customers;

storing, in the electronic memory, conditions for selecting one or more of the plurality of content, the conditions based on geographic locations, times of day, and weather conditions, which are determined in response to indications of a customer interaction with a touchpoint;

receiving, at the computing device, an indication of a customer interaction with a touchpoint presented on a customer mobile device;

in response to the interaction, determining a current geographic location of the customer and a weather condition at the geographic location of the customer;

selecting at least one of the plurality of content of the merchant based on the determining and the conditions; and presenting the at least one of the plurality content of the merchant on the customer mobile device.

24. The method of claim 23 wherein the touchpoint is webpage.

25. The method of claim 23 wherein the touchpoint is indicated by a URL.

26. The method of claim 23 wherein the plurality of conditions include conditions based on increased demand for a product or service during certain of the at least one weather conditions.

27. The method of claim 26 wherein certain of the plurality of the content is selected and transmitted for presenting to the customer based on increased demand for a product or service during certain of the at least one weather conditions.

28. The method of claim 23 wherein the presenting includes presenting on a video display screen of the customer mobile device.

29. The method of claim 23 further comprising processing a customer interaction with a merchant server and entering into a transaction for at least one of a good and a service.

30. The method of claim 23 wherein the content includes one or more offers from merchants that are presented to a customer in response to the weather condition.

31. The method of claim 23 wherein the at least weather conditions include at least one of humidity, precipitation, and temperature.

32. The method of claim 23 wherein the customer interaction with the touchpoint includes an interaction through social media.

33. The method of claim 23 wherein the customer interaction with the touchpoint includes an interaction through a website.

34. The method of claim 23 wherein the plurality of content includes at least one of text, photo, audio, visual, and audio-visual data.

35. The method of claim 23 wherein the plurality of content includes at least one of advertisements, offers, or promotions.

36. The method of claim 23 further comprising adjusting the selected content based on scenarios to increase chances of monetizing a consumer engagement.

37. The method of claim 23 further comprising:
storing demographic data, contact information, biographical data, and marketing preferences of one or more customers; and
determining the demographic data, contact information, biographical data, and marketing preferences of the customer.

38. The method of claim 37 wherein the plurality of conditions includes conditions based on the demographic data, contact information, biographical data, and marketing preferences of the customer.

39. The method of claim 23 wherein the plurality of conditions includes conditions based on the time of day at the geographic location of the customer and selecting of one or more of the plurality of content of the merchant also selects the one or more content based on the time of day at the geographic location of the customer.

40. The method of claim 23, wherein the one or more weather conditions include at least one of a past weather condition, a current weather condition and a future weather condition.

* * * * *